(12) United States Patent
Tanaka et al.

(10) Patent No.: US 9,458,251 B2
(45) Date of Patent: Oct. 4, 2016

(54) CELLULOSE RESIN AND PROCESS FOR PRODUCING THE SAME

(75) Inventors: Shukichi Tanaka, Tokyo (JP); Sungil Moon, Tokyo (JP); Masatoshi Iji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 14/005,489

(22) PCT Filed: Mar. 27, 2012

(86) PCT No.: PCT/JP2012/057879
§ 371 (c)(1),
(2), (4) Date: Sep. 16, 2013

(87) PCT Pub. No.: WO2012/137623
PCT Pub. Date: Oct. 11, 2012

(65) Prior Publication Data
US 2014/0018530 A1 Jan. 16, 2014

(30) Foreign Application Priority Data

Apr. 4, 2011 (JP) ................................ 2011-082969
Sep. 12, 2011 (JP) ................................ 2011-198743

(51) Int. Cl.
| C08B 15/06 | (2006.01) |
| C08G 18/28 | (2006.01) |
| C08G 18/64 | (2006.01) |
| C08G 18/73 | (2006.01) |
| C08G 18/76 | (2006.01) |
| C08G 18/80 | (2006.01) |

(52) U.S. Cl.
CPC ........... *C08B 15/06* (2013.01); *C08G 18/2825* (2013.01); *C08G 18/6484* (2013.01); *C08G 18/73* (2013.01); *C08G 18/7621* (2013.01); *C08G 18/8067* (2013.01)

(58) Field of Classification Search
CPC ... C08B 15/06; C08B 18/8067; C08B 18/73; C08B 18/7621
See application file for complete search history.

(56) References Cited

U.S. PATENT DOCUMENTS

| 5,504,123 A | 4/1996 | Partan, III |
| 7,858,725 B2 | 12/2010 | Dai et al. |
| 7,994,268 B2 | 8/2011 | Dai et al. |
| 8,263,726 B2 | 9/2012 | Dai et al. |
| 8,299,199 B2 | 10/2012 | Dai et al. |

(Continued)

FOREIGN PATENT DOCUMENTS

| CN | 101688016 | 3/2010 |
| CN | 101805494 | 8/2010 |

(Continued)

OTHER PUBLICATIONS

International Search Report, PCT/JP2012/057879, Apr. 24, 2012.
(Continued)

*Primary Examiner* — Liam J Heincer
*Assistant Examiner* — Nicholas Hill
(74) *Attorney, Agent, or Firm* — Young & Thompson

(57) ABSTRACT

A cellulose resin produced by binding a hydrogenated cardanol containing 3-pentadecylcyclohexanol, and cellulose or a derivative thereof through the reaction between a hydroxy group of the hydrogenated cardanol, a hydroxy group of the cellulose or a derivative thereof and isocyanate groups of a diisocyanate compound.

18 Claims, 2 Drawing Sheets

(56) References Cited

U.S. PATENT DOCUMENTS

| | | | |
|---|---|---|---|
| 8,309,674 B2 | 11/2012 | Dai et al. | |
| 8,410,237 B2 | 4/2013 | Dai et al. | |
| 8,415,446 B2 | 4/2013 | Dai et al. | |
| 2012/0196998 A1* | 8/2012 | Iji | C08B 3/16 527/303 |
| 2012/0202926 A1* | 8/2012 | Iji | C08B 3/10 524/41 |
| 2014/0024824 A1* | 1/2014 | Tanaka | C08B 15/06 536/58 |

FOREIGN PATENT DOCUMENTS

| | | | | |
|---|---|---|---|---|
| JP | 63-241060 | | 10/1988 | |
| JP | 01-182301 | | 7/1989 | |
| JP | 10-008035 | | 1/1998 | |
| JP | 11-255801 | | 9/1999 | |
| JP | 2000-219777 | | 8/2000 | |
| JP | 2001-032869 | | 2/2001 | |
| WO | WO 2011/043279 | | 4/2011 | |
| WO | WO 2011/043280 | | 4/2011 | |
| WO | WO 2011043279 A1 * | | 4/2011 | C08B 3/10 |
| WO | WO 2011043280 A1 * | | 4/2011 | C08B 3/10 |
| WO | WO 2012/017769 | | 2/2012 | |
| WO | WO 2012/017772 | | 2/2012 | |
| WO | WO 2011/111272 | | 9/2012 | |

OTHER PUBLICATIONS

Shukichi Tanaka et al., "Cardanol no Sakusan Cellusose eno Graft-ka ni yoru Hikashoku Genryo Baioplastic no Kaihatsu", CSJ: The Chemical Society of Japan Koen Yokoshu, vol. 91st, No. 3, The Chemical Society of Japan, Mar. 11, 2011, p. 923.

Masatoshi Iji et al., Development of durable bioplastic made from non-food biomass: cardanol-grafted cellulose resin, Function & materials, Mar. 5, 2011 (Mar. 2, 2011), vol. 31, No. 4, pp. 50 to 55.

Matoshi Iji et al., "Hisohokuyo Shokubutsu Shigen o Riyo shita Ko Taikyusei no Bioplastic no Kaihatsu—Cashewnut no Kara Yurai no Cardanol o Fuka shita Cellulose Jushi-", Convertech, Feb. 15, 2011, vol. 39, No. 2, pp. 78 to 82.

George John et al., "Cathinic graft copolymerisation of cardanol using borontrifluoridediethyletherate onto cellulose", Polymer Bulletin 22, 89-94 (1989).

Emmett Partain et al., "The Synthesis of Hydrophobe-Modified Hydroxyethyl Cellulose Polymers Using 3-n-Pentadecenyl Phenyl Glycidyl Ether", Polymer Preprints 39, p. 82-83.

Solvents and Solvent Effects in Organic Chemistry, Wiley-VCH Publishers, 2nd ed., 1988, pp. 359-373.

Chinese Office Action, dated Mar. 24, 2015, in corresponding Chinese Patent Application No. 201280017008.8.

* cited by examiner

CELLULOSE RESIN AND PROCESS FOR PRODUCING THE SAME

TECHNICAL FIELD

The present invention relates to a cellulose resin and a process for producing the same.

BACKGROUND ART

Bioplastic using a plant as a raw material can contribute to a countermeasure against petroleum depletion and global warming and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As bioplastic using a non-edible part as a raw material, various types of bioplastics using cellulose, which is a main component of non-edible parts of wood and plant, have been already developed and commercialized.

Cellulose is a high molecular weight compound formed by polymerization of β-glucose. Since cellulose has high crystallinity, it is hard, fragile and absent of thermoplasticity. In addition, since cellulose contains many hydroxy groups, water absorbability is high and water resistance is low. Then, various investigations have been made to improve the properties of cellulose.

For example, Patent Literature 1 (JP11-255801A) discloses a biodegradable graft polymer having thermoplasticity obtained by ring-opening graft polymerization of ε-caprolactone with cellulose acetate having a hydroxy group.

Meanwhile, a material using a component of a non-edible part other than cellulose has been developed. For example, cardanol derived from cashew nutshell, since it has stable amount of production and excellent functionality ascribed to its characteristic molecular structure, has found various applications.

As an example of using cardanol, Patent Literature 2 (JP10-8035A) discloses a friction material for brake, which is formed of a fiber base material made of an aramid pulp and a cellulose fiber, and a filler made of calcium carbonate and cashew dust, with the use of a binder made of a phenol resin. Patent Literature 3 (JP2001-32869A) discloses a friction material which is formed of a base material made of an aramid fiber and a cellulose fiber, and a filler made of graphite and cashew dust, with the use of an organic/inorganic composite binder. It is described that the friction material is applied to clutch facing of a power transmission system of automobiles etc.

In Non Patent Literature 1 (George John et al., Polymer Bulletin, 22, p. 89-94 (1989)), it is described that water resistance of paper can be improved by soaking a paper sheet in cardanol to perform a grafting reaction through which cardanol binds to cellulose constituting the paper sheet. It is described that, in the grafting reaction, a terminal double bond of cardanol binds to a hydroxy group of cellulose in the presence of boron trifluoride diethyl ether ($BF_3$—$OEt_2$).

In Non Patent Literature 2 (Emmett M. Partain et al., Polymer Preprints, 39, p. 82-83 (1998)), it is described that water resistance is improved by binding cardanol having an epoxy group introduced therein to hydroxyethylcellulose.

CITATION LIST

Patent Literature

Patent Literature 1: JP11-255801A
Patent Literature 2: JP10-8035A
Patent Literature 3: JP2001-32869A

Non Patent Literature

Non Patent Literature 1: George John et al., Polymer Bulletin, 22, p. 89-94 (1989)
Non Patent Literature 2: Emmett M. Partain et al., Polymer Preprints, 39, p. 82-83 (1998)

SUMMARY OF INVENTION

Technical Problem

Cellulose bioplastic, whose properties are influenced by inherent properties of cellulose, is insufficient in strength, heat resistance, water resistance and thermoplasticity. These properties need to be improved particularly when cellulose bioplastic is applied to durable products such as packaging for electronic devices.

Cellulose bioplastic has the following problems. When a plasticizer is added in order to improve thermoplasticity, heat resistance and strength (in particular, rigidity) decrease and uniformity decreases and bleed out of a plasticizer (a plasticizer bleeds out in the surface of a molded product) occurs. Furthermore, when a plasticizer formed of a petroleum feedstock is added in a large amount, the ratio of plant utilization (vegetism) decreases.

An object of the present invention is to provide a cellulose resin improved not only in thermoplasticity (moldability), heat resistance, strength and water resistance but also in lightness of color and having high vegetism and a high ratio of a non-edible part utilization, and to provide a method for easily producing the resin.

Solution to Problem

According to an aspect of the present invention, there is provided a cellulose resin produced by binding a hydrogenated cardanol including 3-pentadecylcyclohexanol, and cellulose or a derivative thereof through a reaction between a hydroxy group of the hydrogenated cardanol, a hydroxy group of the cellulose or a derivative thereof and isocyanate groups of a diisocyanate compound.

According to another aspect of the present invention, there is provided a resin composition containing the aforementioned cellulose resin as a base resin.

According to another aspect of the present invention, there is provided a molding material containing the aforementioned cellulose resin as a base resin.

According to another aspect of the present invention, there is provided a method for producing a cellulose resin, including:
binding a hydrogenated cardanol including 3-pentadecylcyclohexanol, and a diisocyanate compound by reacting a hydroxy group of the hydrogenated cardanol and an isocyanate group of the diisocyanate compound to form a diisocyanate-added cardanol derivative, and binding the diisocyanate-added cardanol derivative and cellulose or a derivative thereof by reacting an isocyanate group of the diisocyanate-added cardanol derivative and a hydroxy group of the cellulose or a derivative thereof.

Advantageous Effects of Invention

According to an exemplary embodiment of the present invention, there is provided a cellulose resin improved not only in thermoplasticity (moldability), heat resistance, strength and water resistance but also in lightness of color and having high vegetism and a high ratio of a non-edible part utilization, and provided a method for easily producing the resin.

DESCRIPTION OF EMBODIMENTS

Figure 1:
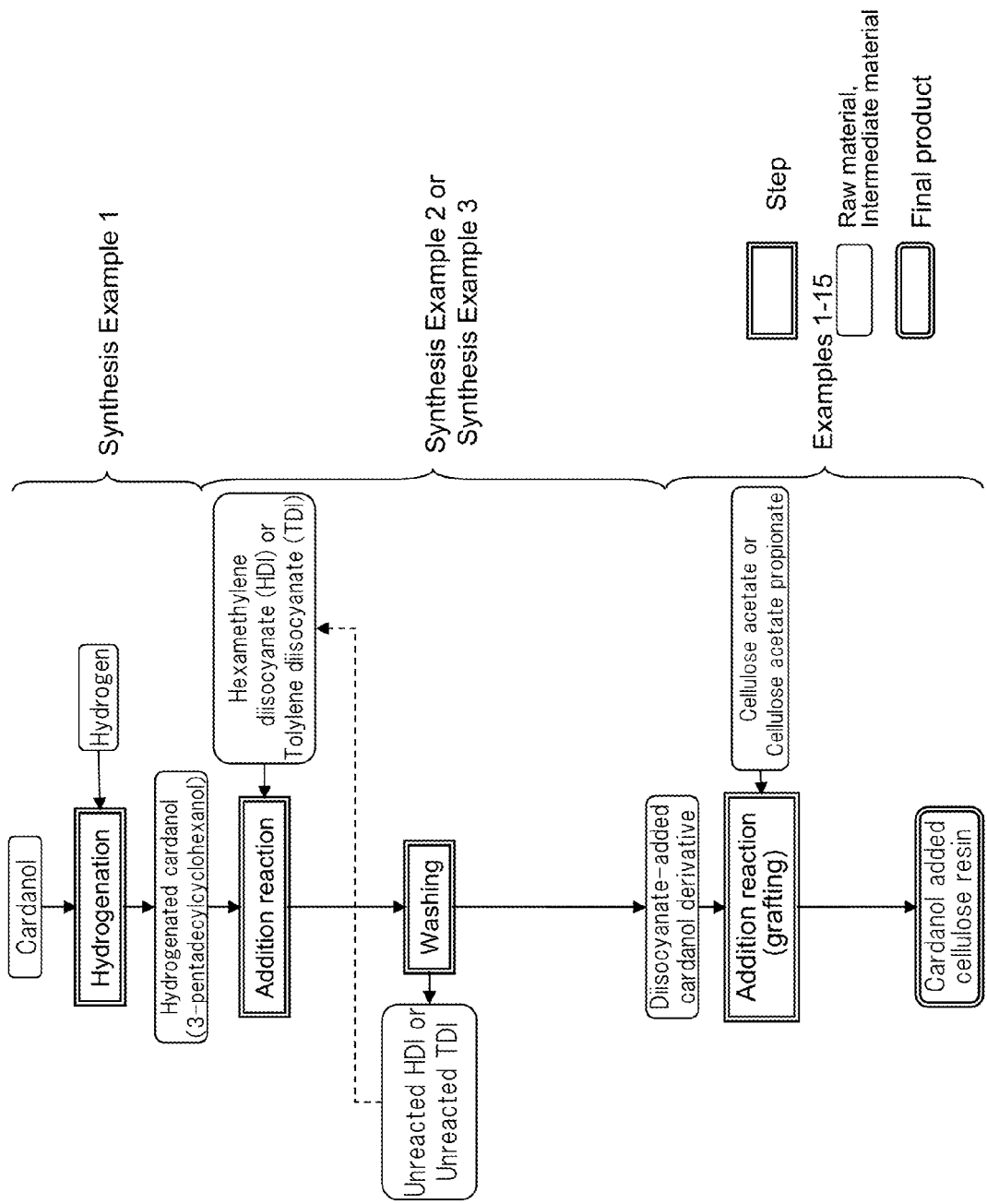
FIG. 1 is a process chart of a cellulose resin according to Examples of the present invention.

A cellulose resin according to an exemplary embodiment of the present invention is prepared by binding hydrogenated cardanol (3-pentadecylcyclohexanol) to cellulose or a derivative thereof by use of a diisocyanate compound. Hereinafter, binding (addition) of cardanol or a derivative thereof to cellulose or a derivative thereof is appropriately referred to as "grafting".

In the cellulose resin, the hydroxy group of the hydrogenated cardanol and one of the isocyanate groups of a diisocyanate compound are reacted and bound, and the other isocyanate group and a hydroxy group of cellulose or a derivative thereof are reacted to bound.

Owing to such grafting, mechanical characteristics (particularly toughness), water resistance and lightness of color can be improved. Furthermore, since good thermoplasticity is provided by the grafting, the amount of plasticizer to be added can be reduced or a plasticizer may not be added. As a result, heat resistance and strength (particularly rigidity) can be suppressed from reducing compared to the cellulose resin containing a plasticizer, and homogeneity of the resultant resin can be improved. In addition, a problem of bleed out can be overcome. Furthermore, since the addition amount of plasticizer made of a petroleum feedstock can be lowered or reduced to zero, the ratio of plant utilization can be increased. In addition, since cellulose and cardanol are both derived from a non-edible part of a plant, utilization of a non-edible part can be enhanced.

Furthermore, in grafting hydrogenated cardanol (3-pentadecylcyclohexanol) to cellulose or a derivative thereof, use of a diisocyanate compound enables to easily produce a grafted cellulose resin.

In the cellulose resin according to an exemplary embodiment of the present invention, the number $DS_{CD}$ of hydrogenated cardanol molecules to be added per glucose unit is preferably 0.1 or more.

Furthermore, the number of remaining hydroxy groups per glucose unit, $DS_{OH}$, is preferably 0.9 or less.

To a hydroxy group of cellulose or a derivative thereof, a reactive hydrocarbon compound having a functional group capable of reacting with the hydroxy group can be added. As the reactive hydrocarbon compound, compounds having a carboxyl group, a carboxylic halide group, a carboxylic acid anhydride group and an isocyanate group can be used. As the reactive hydrocarbon compound, an aliphatic monocarboxylic acid, an aromatic monocarboxylic acid, alicyclic monocarboxylic acid, each of the acid halides or acid anhydrides of these monocarboxylic acids, an aliphatic monoisocyanate, an aromatic monoisocyanate and an alicyclic monoisocyanate can be used. The number $DS_{XX}$ of the reactive hydrocarbon compounds to be added per glucose unit can be set at 0.1 or more.

Furthermore, at least one type of acyl group selected from an acetyl group, a propionyl group and a butyryl group can be added to a hydroxy group of cellulose or a derivative thereof. The number $DS_{AC}$ of the acyl groups to be added per glucose unit can be set at 0.5 or more.

Furthermore, at least one type of first acyl group selected from an acetyl group, a propionyl group and a butyryl group and at least one type of second acyl group derived from a monocarboxylic acid selected from an aromatic carboxylic acid and an alicyclic carboxylic acid can be added to a hydroxy group of cellulose or a derivative thereof. The number of the first acyl group to be added per glucose unit, $DS_{AC}$, can be set at 0.5 or more and the number of the second acyl group to be added per glucose unit, $DS_{XX}$, can be set at 0.1 or more.

Furthermore, the total amount of cellulose component and cardanol component is preferably 50% by mass or more based on the whole resin.

The resin composition according to an exemplary embodiment of the present invention contains a cellulose resin as a base resin and can further contain a thermoplastic polyurethane elastomer or a modified silicone compound.

[Cellulose or a Derivative Thereof]

Cellulose is a straight-chain polymer of β-glucose, represented by the following formula (1) and each glucose unit has three hydroxy groups. Using these hydroxy groups, a cardanol derivative can be grafted.

[Formula 1]

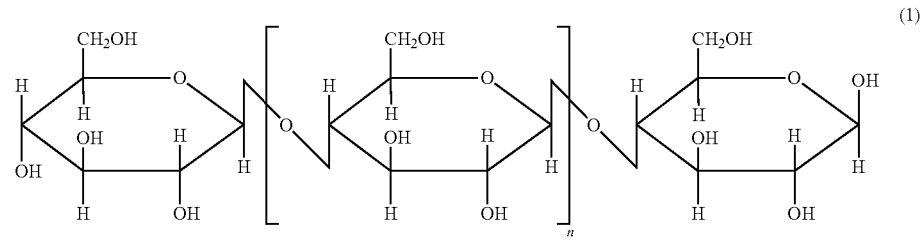

Cellulose is a main component of a plant and can be obtained by a separation treatment for removing other components such as lignin from a plant. Other than the cellulose thus obtained, cellulose obtained by purification of cotton or pulp rich in cellulose content can be used, or the cotton or pulp can be directly used.

The polymerization degree of cellulose (or a derivative thereof) preferably falls within the range of 50 to 5000 and more preferably 100 to 3000 in terms of glucose polymerization degree. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

Cellulose (or a derivative thereof) may be mixed with chitin and chitosan having an analogous structure. When cellulose is mixed with them, the amount thereof is preferably 30% by mass or less relative to the total amount of mixture, preferably 20% by mass or less and further preferably 10% by mass or less.

A cellulose derivative herein refers to cellulose having hydroxy groups partly acylated, etherified or grafted. Specific examples thereof include organic acid esters such as cellulose acetate, cellulose butyrate and cellulose propionate; inorganic acid esters such as cellulose nitrate, cellulose sulfate and cellulose phosphate; mixed esters such as cellulose acetate propionate, cellulose acetate butyrate, cellulose acetate phthalate and cellulose acetate nitrate; and etherified cellulose such as methylcellulose, hydroxyethylcellulose and hydroxypropylcellulose. Furthermore, celluloses grafted with styrene, (meth)acrylic acid, (meth)acrylate, ε-caprolactone, lactide, glycolide, etc. These acylated cellulose, etherified cellulose and grafted cellulose may be used singly or in combination of two or more types.

As the cellulose (or a derivative thereof) of the exemplary embodiment, for example, at least one acylated cellulose selected from a cellulose acetate, cellulose propionate and cellulose butyrate which have a part of the hydroxy groups acylated can be preferably used.

The term "cellulose derivative" used herein includes both a cellulose compound and a compound having a cellulose skeleton obtained by biologically or chemically introducing a functional group into raw-material cellulose.

[Grafting of Hydrogenated Cardanol (3-pentadecylcyclohexanol)]

Hydrogenated cardanol (3-pentadecylcyclohexanol) is obtained from cardanol, which is a component contained in the shell of cashew nut. Cardanol is an organic compound having a phenol moiety and a straight-chain hydrocarbon moiety and represented by the following formula (2). There are 4 types of cardanols different in the number of unsaturated bonds in the straight-chain hydrocarbon moiety R. Usually, cardanol is a mixture of these 4 components. To be more specific, cardanol is a mixture of 3-pentadecylphenol, 3-pentadecylphenol monoene, 3-pentadecylphenol diene and 3-pentadecylphenol triene, described in the following formula (2). Cardanol obtained by extracting and purifying from a cashew nutshell liquid can be used.

[Formula 2]

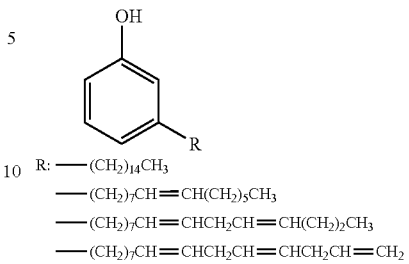

(2)

R: ——(CH$_2$)$_{14}$CH$_3$
——(CH$_2$)$_7$CH═CH(CH$_2$)$_5$CH$_3$
——(CH$_2$)$_7$CH═CHCH$_2$CH═CH(CH$_2$)$_2$CH$_3$
——(CH$_2$)$_7$CH═CHCH$_2$CH═CHCH$_2$CH═CH$_2$

The straight-chain hydrocarbon moiety of cardanol contributes to improving flexibility and hydrophobicity of a resin, whereas the phenol moiety has a highly reactive hydroxy group for use in grafting. When hydrogenated cardanol (3-pentadecylcyclohexanol) obtained from such cardanol is grafted to cellulose (or a derivative thereof), a cellulose structure to which hydrogenated cardanol (3-pentadecylcyclohexanol) is added like bristles is formed. As a result, hydrogenated cardanol bristles thus grafted interact with each other to improve mechanical characteristics (particularly toughness), as well as to impart thermoplasticity. In addition, owing to hydrophobicity of hydrogenated cardanol, water resistance can be improved.

Hydrogenated cardanol (3-pentadecylcyclohexanol) is obtained by converting the unsaturated bonds (double bonds) of the phenol moiety of the cardanol and a straight-chain hydrocarbon moiety thereof into saturated bonds by hydrogenation. The conversion rate (hydrogenation rate) of the unsaturated bonds by hydrogenation is preferably 90% by mole or more and more preferably 95% by mole or more. After hydrogenation, the residual ratio of unsaturated bonds in cardanol (the number of unsaturated bonds per cardanol molecule) is preferably 0.2 bonds/molecule or less and more preferably 0.1 bond/molecule or less.

When hydrogenated cardanol (3-pentadecylcyclohexanol) in which a large number of unsaturated bonds still remain in the phenol moiety, is grafted to cellulose (or a derivative thereof) via a diisocyanate compound, a crosslinking decomposition reaction proceeds during heat-welding time, with the result that thermoplasticity may disappear. When hydrogenated cardanol (3-pentadecylcyclohexanol), in which unsaturated bonds of the phenol moiety are sufficiently converted into saturated bonds by hydrogenation, is grafted, the crosslinking decomposition reaction during heat-welding time is suppressed to obtain a grafted cellulose resin having satisfactory thermoplasticity.

Furthermore, when hydrogenated cardanol (3-pentadecylcyclohexanol) in which a large number of unsaturated bonds still remain in the straight-chain hydrocarbon moiety, is grafted to cellulose (or a derivative thereof), a side reaction is likely to occur, with the result that grafting cannot be efficiently performed and the solubility of a grafted product in a solvent may often significantly reduce. When a cardanol derivative, in which an unsaturated bond(s) of the straight-chain hydrocarbon moiety are sufficiently converted into saturated bonds by hydrogenation, is grafted, grafting can be efficiently performed whereas a side reaction is suppressed and in addition, reduction of solubility of a grafted product in a solvent can be suppressed.

The hydrogenation method is not particularly limited and a method known in the art can be used. As the catalyst, a precious metal such as palladium, ruthenium, rhodium and platinum or nickel, or a metal selected from these immobilized on a carrier such as activated carbon, activated alumina and diatom earth is mentioned. As the reaction system, a batch system, in which a reaction is performed while suspending and stirring a powdery catalyst, and a continuous system using a reaction tower charged with a molded catalyst, can be employed. The solvent for hydrogenation may not be used depending upon the system of hydrogenation. However, when a solvent is used, alcohols, ethers, esters and saturated hydrocarbons are generally mentioned. The reaction temperature for hydrogenation is not particularly limited; however, it can be usually set at 20 to 250° C. and preferably 50 to 200° C. If the reaction temperature is excessively low, a hydrogenation rate becomes low. Conversely, if the reaction temperature is excessively high, the amount of decomposition product may increase. The hydrogen pressure during the hydrogenation can be usually set at 10 to 80 kgf/cm$^2$ ($9.8 \times 10^5$ to $78.4 \times 10^5$ Pa) and preferably 20 to 50 kgf/cm$^2$ ($19.6 \times 10^5$ to $49.0 \times 10^5$ Pa).

Hydrogenation can be performed before a diisocyanate-added cardanol derivative is formed, after a diisocyanate-added cardanol derivative is formed and before the cardanol derivative is grafted, or after a diisocyanate-added cardanol derivative is grafted; however, in view of the reaction efficiency of hydrogenation and grafting reaction, hydrogenation is preferably performed before a diisocyanate-added cardanol derivative is grafted and further preferably before a diisocyanate-added cardanol derivative is formed.

Grafting is performed by using a diisocyanate compound capable of reacting with a hydroxy group of cellulose (or a derivative thereof) and the hydroxy group of hydrogenated cardanol (3-pentadecylcyclohexanol). As a result, the carbon atom of cellulose to which the hydroxy group of cellulose (or a derivative thereof) is bound and the cardanol carbon atom to which the hydroxy group of hydrogenated cardanol (3-pentadecylcyclohexanol) is bound are connected via two urethane bonds linked with an organic group (for example, an alkylene chain having 3 to 12 carbon atoms). Due to such grafting, the efficiency of a grafting reaction can be improved and a side reaction can be suppressed. In addition, production can be made by a simple method having a fewer manufacturing steps with less amount of by-product.

For example, one of the isocyanate groups of a diisocyanate compound is bound to the hydroxy group of hydrogenated cardanol (3-pentadecylcyclohexanol) to obtain a diisocyanate-added cardanol derivative. Subsequently, the resultant diisocyanate-added cardanol derivative and cellulose (or a derivative thereof) can be bound by use of a hydroxy group of cellulose (or a derivative thereof) and the isocyanate group of the diisocyanate-added cardanol derivative.

According to the aforementioned grafting, the hydroxy group of cellulose (or a derivative thereof) and the hydroxy group of hydrogenated cardanol (3-pentadecylcyclohexanol) are eliminated to form a graft bond; at the same time, the hydrophobic structure of cardanol can be introduced into cellulose (or a derivative thereof) to improve water resistance.

To graft hydrogenated cardanol (3-pentadecylcyclohexanol) to cellulose (or a derivative thereof), the hydroxy group of hydrogenated cardanol (3-pentadecylcyclohexanol) and a hydroxy group of cellulose are preferably used as mentioned above in view of efficiency of a grafting reaction, resultant molecular structure and water resistance. Since such grafting is made by use of a highly-reactive hydroxy group, more efficient grafting can be realized compared to grafting using an unsaturated bond (double bond) of the straight-chain hydrocarbon moiety of cardanol. Furthermore, according to the grafting of the exemplary embodiment, since the cyclohexane moiety of hydrogenated cardanol (3-pentadecylcyclohexanol) reacts with cellulose and fixed to it, interaction between mutual straight-chain hydrocarbon moieties of the grafted hydrogenated cardanol (3-pentadecylcyclohexanol) molecules enhances, and thus a desired effect of improving mechanical characteristics can be obtained. Furthermore, in the exemplary embodiment, grafting is performed by eliminating the hydroxy group of a cardanol derivative, water resistance can be improved (suppressing water absorbability) compared to grafting that does not use a hydroxy group. Also from this point of view, the grafting of the exemplary embodiment is advantageous.

The aforementioned diisocyanate compound is preferably a compound containing a hydrocarbon group to which two isocyanate groups are bound. The number of carbon atoms of the hydrocarbon group is preferably 3 or more and also preferably 20 or less and preferably 15 or less and further preferably 12 or less. If the number of carbon atoms is excessively large, the molecule becomes excessively large and thus reactivity reduces. As a result, it is often difficult to increase a grafting rate.

Examples of such a hydrocargon group include a divalent straight-chain aliphatic hydrocarbon groups (particularly, straight-chain alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups having the free valence on a carbon atom of a aliphatic ring such as a cycloheptane ring, a cyclohexane ring, a cyclooctane ring, a bicyclopentane ring, a tricyclohexane ring, a bicyclooctane ring, a bicyclononane ring and a tricyclodecane ring; divalent aromatic hydrocarbon groups (phenylene group, naphthylene group, biphenylene group and the like) having the free valence on a carbon atom of an aromatic ring such as a benzene ring and a naphthalene ring; and divalent groups composed of combinations of these.

When a hydrocarbon group as mentioned above is an aromatic hydrocarbon group or an alicyclic hydrocarbon group, because of its stiffness, the rigidity of the resultant resin can be improved. In contrast, when the aforementioned hydrocarbon group is a straight-chain aliphatic hydrocarbon group, because of its flexibility, the toughness of the resultant resin can be improved. In particular, an aliphatic diisocyanate having a straight-chain alkylene chain having 3 to 12 carbon atoms to both ends of which an isocyanate group is bound is preferable.

Specific examples of such a diisocyanate compound include aliphatic diisocyanate compounds such as 1,3-trimethylene diisocyanate, 1,4-tetramethylene diisocyanate, 1,6-hexamethylene diisocyanate (HDI), 1,8-octamethylene diisocyanate and 1,12-dodecamethylene diisocyanate; aromatic diisocyanate compounds such as tolylene diisocyanate (TDI), 4,4'-diphenylmethane diisocyanate (MDI), 1,5-naphthylene diisocyanate (NDI), tolidine diisocyanate, xylene diisocyanate (XDI) and tetramethylxylene diisocyanate (TMXDI); and alicyclic diisocyanate compounds such as dicyclohexylmethane diisocyanate (HMDI: hydrogenated MDI), hydrogenated XDI and isophorone diisocyanate (IPDI). Of these, 1,6-hexamethylene diisocyanate (HDI), tolylene diisocyanate (TDI) and 4,4'-diphenylmethane diisocyanate (MDI) can be preferably used.

An isocyanate group of a diisocyanate compound as mentioned above and the hydroxy group of a cardanol derivative are reacted to form a diisocyanate-added cardanol derivative, and then, the diisocyanate-added cardanol derivative is bound to cellulose (or a derivative thereof) by reacting a hydroxy group of cellulose (or a derivative thereof) and the isocyanate group of the diisocyanate-added cardanol derivative.

In a method for performing grafting by use of such a diisocyanate compound, a cellulose resin can be more easily produced with a fewer reaction steps without producing by-products, compared to a method in which a carboxylic multifunctional compound (dicarboxylic acid, carboxylic acid anhydride or monochloro acetic acid) is reacted with cardanol to prepare a cardanol derivative having a carboxyl group and the carboxylic acid group of the derivative is allowed to bind to the hydroxy group of cellulose (or a derivative thereof).

The ratio (grafting rate) of hydrogenated cardanol bound to cellulose (or a derivative thereof) relative to the cellulose (or a derivative thereof) is represented by the number ($DS_{CD}$) (average value) of hydrogenated cardanol molecules to be added per glucose unit of cellulose (or a derivative thereof), in other words, the number of hydroxy groups bound to hydrogenated cardanol molecules (the degree of substitution of the hydroxy group) (average value). $DS_{CD}$ is preferably 0.1 or more and more preferably 0.2 or more. $DS_{CD}$ may be set to 0.4 or more. When $DS_{CD}$ is excessively low, the effect by grafting may not be sufficiently obtained.

The maximum value of $DS_{CD}$ is theoretically "3"; however, in view of facilitating production (grafting), $DS_{CD}$ is preferably 2.5 or less, more preferably 2 or less and further preferably 1.5 or less. Furthermore, $DS_{CD}$ may be 1 or less. Even in this case, sufficient improvement effect can be obtained. If $DS_{CD}$ increases, tensile breaking strain (toughness) increases; whereas, the maximum strength (tensile strength, bending strength) tends to decrease. Therefore, $DS_{CD}$ is preferably set appropriately in accordance with desired properties.

[Grafting of Reactive Hydrocarbon Compounds]

Hydrogenated cardanol is grafted and simultaneously, a specific reactive hydrocarbon compound may be grafted to cellulose (or a derivative thereof). Owing to this, a cellulose resin can be improved so as to have desired properties.

This reactive hydrocarbon compound is a compound having at least one functional group capable of reacting with a hydroxy group of cellulose (or a derivative thereof). Examples thereof include hydrocarbon compounds having a carboxyl group, a carboxylic halide group, a carboxylic acid anhydride group, an isocyanate group, a chloroformate group or an acryl group. Specific examples thereof include at least one compound selected from monocarboxylic acids such as an aliphatic monocarboxylic acid, an aromatic monocarboxylic acid and an alicyclic monocarboxylic acid, and acid halides or acid anhydrides thereof; at least one compound selected from an aliphatic monoisocyanate, an aromatic monoisocyanate and an alicyclic monoisocyanate; at least one compound selected from an aliphatic monochloroformate, an aromatic monochloroformate and an alicyclic monochloroformate; an acrylic acid ester; and a methacrylic acid ester.

As the aliphatic monocarboxylic acid, a straight or branched (having a side chain) fatty acid is mentioned. Examples of the aromatic monocarboxylic acid include an aromatic monocarboxylic acid having a carboxyl group directly bound to an aromatic ring and an aromatic monocarboxylic acid having a carboxyl group bound to the aromatic ring via an alkylene group (for example, methylene group, ethylene group) (the acid having an aliphatic carboxylic acid group bound to the aromatic ring). Examples of the alicyclic monocarboxylic acid include an alicyclic monocarboxylic acid having a carboxyl group directly bound to an alicycle and an alicyclic monocarboxylic acid having a carboxyl group bound to an alicycle (an aliphatic carboxylic acid group bound to the alicycle) via an alkylene group (for example, methylene group, ethylene group) (the acid having an aliphatic carboxylic acid group bound to an alicycle).

Examples of the aliphatic monoisocyanate include an aliphatic monoisocyanate having an isocyanate group bound to a straight aliphatic hydrocarbon or a branched aliphatic hydrocarbon having a side chain. Examples of the aromatic monoisocyanate include an aromatic monoisocyanate having an isocyanate group directly bound to an aromatic ring and an aromatic monoisocyanate having an isocyanate group bound to an aromatic ring via an alkylene group (for example, a methylene group or an ethylene group) (the aromatic monoisocyanate having an aliphatic isocyanate group bound to an aromatic ring). Examples of the alicyclic monoisocyanate include an alicyclic monoisocyanate having an isocyanate group directly bound to an alicycle and an alicyclic monoisocyanate having an isocyanate group bound to an alicycle via an alkylene group (for example, a methylene group or an ethylene group) (the alicyclic monoisocyanate having an aliphatic isocyanate group bound to an alicycle).

Examples of the aliphatic monochloroformate include an aliphatic monochloroformate having a chloroformate group bound to a straight aliphatic hydrocarbon or a branched aliphatic hydrocarbon having a side chain. Examples of the aromatic monochloroformate include an aromatic monochloroformate having a chloroformate group directly bound to an aromatic ring and an aromatic monochloroformate having a chloroformate group bound to an aromatic ring via an alkylene group (for example, a methylene group or an ethylene group) (the aromatic monochloroformate having an aliphatic chloroformate group bound to an aromatic ring). Examples of the alicyclic monochloroformate include an alicyclic monochloroformate having a chloroformate group directly bound to an alicycle and an alicyclic monochloroformate having a chloroformate group bound to an alicycle via an alkylene group (for example, a methylene group or an ethylene group) (the alicyclic monochloroformate having an aliphatic chloroformate group bound to an alicycle).

The reactive hydrocarbon compound preferably has carbon atoms within the range of 1 to 32 and more preferably within the range of 1 to 20. If the number of carbon atoms is excessively large, the size of the molecule becomes excessively large and reaction efficiency decreases due to steric hindrance. As a result, it becomes difficult to increase a grafting rate.

The reactive hydrocarbon compound is effective in improving properties in the case where it is particularly arranged so as to bury gaps in a sterical structure composed of grafted hydrogenated cardanols.

When the hydrocarbon group of the reactive hydrocarbon compound is an aromatic hydrocarbon group and an alicyclic hydrocarbon group, it efficiently works to particularly improve rigidity and heat resistance. When the hydrocarbon group is an aliphatic hydrocarbon group, it efficiently works to particularly improve toughness.

Examples of the aliphatic monocarboxylic acid to be used as the reactive hydrocarbon compound include saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; unsaturated fatty acids such as butenoic acid, pentenoic acid, hexenoic acid, octenoic acid, undecylenic acid, oleic acid, sorbic acid, linoleic acid, linolenic acid and arachidonic acid; and derivatives of these. These may further have a substituent.

Examples of the aromatic monocarboxylic acid used as the reactive hydrocarbon compound include an aromatic carboxylic acid having a carboxyl group introduced in a benzene ring such as benzoic acid; an aromatic carboxylic acid having an alkyl group introduced in a benzene ring such as toluic acid; an aromatic carboxylic acid having an aliphatic carboxylic acid group introduced in a benzene ring such as phenylacetic acid and phenyl propionic acid; an aromatic carboxylic acid having two or more benzene rings such as biphenylcarboxylic acid and biphenylacetic acid; an aromatic carboxylic acid having a condensed-ring structure such as naphthalene carboxylic acid and tetralin carboxylic acid; and derivatives of these.

Examples of the alicyclic monocarboxylic acid to be used as the reactive hydrocarbon compound include an alicyclic monocarboxylic acid having a carboxyl group introduced to an alicycle such as cyclopentane carboxylic acid, cyclohexane carboxylic acid and cyclooctane carboxylic acid; alicyclic monocarboxylic acids having an aliphatic carboxylic acid introduced in an alicycle such as cyclohexyl acetic acid; and derivatives of these.

Examples of the aliphatic monoisocyanate used as the reactive hydrocarbon compound include saturated aliphatic isocyanates such as methyl isocyanate, ethyl isocyanate, propyl isocyanate, isopropyl isocyanate, butyl isocyanate, pentyl isocyanate, hexyl isocyanate, heptyl isocyanate, octyl isocyanate, nonyl isocyanate, decyl isocyanate, dodecyl isocyanate and octadecyl isocyanate; unsaturated aliphatic isocyanates such as butenyl isocyanate, pentenyl isocyanate, hexenyl isocyanate, octenyl isocyanate and dodecenyl isocyanate; and derivatives of these. These may further have a substituent.

Examples of the aromatic monoisocyanate used as the reactive hydrocarbon compound include an aromatic monoisocyanate having an isocyanate group introduced in a benzene ring, such as phenyl isocyanate; an aromatic monoisocyanate having an alkyl group introduced in a benzene ring, such as tolyl isocyanate; an aromatic monoisocyanate having an aliphatic isocyanate group introduced in a benzene ring, such as phenylmethyl isocyanate and phenylethyl isocyanate; an aromatic isocyanate having two or more benzene rings, such as biphenyl isocyanate and biphenyl methyl isocyanate; aromatic isocyanate having a condensation ring structure, such as naphthaline isocyanate and tetralin isocyanate; and derivatives of these.

Examples of the alicyclic monoisocyanate used as the reactive hydrocarbon compound include an alicyclic monoisocyanate having an isocyanate group introduced in an alicycle, such as cyclopentyl isocyanate, cyclohexyl isocyanate and cyclooctyl isocyanate; an alicyclic monoisocyanate having an aliphatic isocyanate group introduced in an alicycle, such as cyclohexylmethyl isocyanate; and derivatives of these.

Examples of the aliphatic monochloroformate used as the reactive hydrocarbon compound include saturated aliphatic chloroformates such as methyl chloroformate, ethyl chloroformate, propyl chloroformate, isopropyl chloroformate, butyl chloroformate, pentyl chloroformate, hexyl chloroformate, heptyl chloroformate, octyl chloroformate, nonyl chloroformate, decyl chloroformate, dodecyl chloroformate and octadecyl chloroformate; unsaturated aliphatic chloroformates such as butenyl chloroformate, pentenyl chloroformate, hexenyl chloroformate, octenyl chloroformate and dodecenyl chloroformate; and derivatives of these. These may further have a substituent.

Examples of the aromatic monochloroformate used as the reactive hydrocarbon compound include an aromatic monochloroformate having a chloroformate group introduced in a benzene ring, such as phenyl chloroformate; an aromatic monochloroformate having an alkyl group introduced in a benzene ring, such as tolyl chloroformate; an aromatic monochloroformate having an aliphatic chloroformate group introduced in a benzene ring, such as phenylmethyl chloroformate and phenylethyl chloroformate; an aromatic chloroformate having two or more benzene rings, such as biphenyl chloroformate and biphenylmethyl chloroformate; an aromatic chloroformate having a condensation ring structure such as naphthaline chloroformate and tetralin chloroformate; and derivatives of these.

Examples of the alicyclic monochloroformate used as the reactive hydrocarbon compound include an alicyclic monochloroformate having a chloroformate group introduced in an alicycle, such as cyclopentyl chloroformate, cyclohexyl chloroformate and cyclooctyl chloroformate; an alicyclic monochloroformate having an aliphatic chloroformate group introduced in an alicycle such as cyclohexylmethyl chloroformate; and derivatives of these.

If an organic silicon compound and an organic fluorine compound are added to these reactive hydrocarbon compound structures, properties such as water resistance can be more effectively improved.

As the reactive functional groups of these reactive hydrocarbon compounds, any reactive functional groups are used as long as they can react with a hydroxy group of cellulose. Examples thereof include a carboxyl group, a carboxylic acid halide group (particularly, a carboxylic acid chloride group), a carboxylic acid anhydride, an isocyanate group, a chloroformate group and further include an epoxy group and a halogen group (particularly, a chloride group). Of these, a carboxyl group, a carboxylic acid halide group, an isocyanate group and a chloroformate group are preferable, and a carboxylic acid chloride group, an isocyanate group and a chloroformate group are particularly preferable. As the carboxylic acid halide group (particularly, a carboxylic acid chloride group), an acid halide group (particularly, an acid chloride group) in which a carboxyl group of each of the carboxylic acids mentioned above is acid-halogenated, is mentioned.

As the reactive hydrocarbon compound used in the exemplary embodiment, particularly in view of rigidity (bending strength, etc.) of a resin, at least one monocarboxylic acid selected from aromatic carboxylic acids and alicyclic carboxylic acids, an acid halide or acid anhydride thereof, aromatic monoisocyanate, aliphatic monoisocyanate, aromatic monochloroformate and aliphatic monochloroformate are preferable. By adding such a reactive hydrocarbon compound to a hydroxy group of cellulose, a structure in which an acyl group derived from at least one type of monocarboxylic acid selected from aromatic carboxylic acids and alicyclic carboxylic acids, a carbamoyl group derived from at least one type of monoisocyanate selected from aromatic monoisocyanates and alicyclic monoisocyanates, or a carbonate group derived from at least one type of chloroformate selected from aromatic monochloroformates and alicyclic monochloroformates is added to the hydroxy group of cellulose, (more specifically, the structure formed by substituting the hydrogen atom of a hydroxy group of cellulose with an acyl group, a carbamoyl group or a carbonate group) can be obtained.

The number (average value) of reactive hydrocarbon compounds (the number of acyl groups, carbamoyl groups or carbonate groups, $DS_{XX}$) to be added per glucose unit of cellulose (or a derivative thereof), in other words, the number of hydroxy groups bound to a reactive hydrocarbon compound (the degree of substitution of the hydroxy group) (average value) is, in view of obtaining a desired effect, preferably 0.1 or more and 0.6 or less and more preferably 0.1 or more and 0.5 or less.

Furthermore, after hydrogenated cardanol and a reactive hydrocarbon compound are grafted, the number of remaining hydroxy groups per glucose unit (hydroxy group remaining degree, $DS_{OH}$) (average value) is, in view of sufficiently ensuring water resistance and resistance to thermal decomposition, preferably 0.9 or less and more preferably, 0.7 or less.

The reactive hydrocarbon compound can be grafted in the grafting step of hydrogenated cardanol. Owing to this, grafting can be made uniformly. At this time, these may be added simultaneously or separately. However, if hydrogenated cardanol is grafted and thereafter a reactive hydrocarbon compound is added and grafted, the efficiency of a grafting reaction can be improved.

[Grafting Treatment]

A grafting treatment can be performed by heating cellulose (or a derivative thereof) and hydrogenated cardanol, if necessary, a reactive hydrocarbon compound in a solvent dissolving them, with a catalyst if necessary, at an appropriate temperature. Cellulose is rarely dissolved in a general solvent; however dissolved in e.g., a dimethylsulfoxide-amine solvent, a dimethylformamide-chloral-pyridine solvent, a dimethylacetamide-lithium chloride solvent and an imidazolium ionic liquid. When a grafting reaction is performed in a general solvent, a cellulose derivative, the solubility of which has been changed by previously binding a carboxylic acid and an alcohol to a part of hydroxy groups of cellulose to reduce intermolecular force, can be used. Acylated cellulose having a hydroxy group whose hydrogen atom is substituted with an acyl group such as an acetyl group, a propionyl group and a butyryl group is preferable. In particular, cellulose acetate, which is an acetylated cellulose with acetic acid or acetyl chloride is preferable. Acetic acid, propionic acid, butyric acid and an acid halide and acid anhydride thereof are included in the aforementioned reactive hydrocarbon compounds; however, like this example, whole or part of predetermined reactive hydrocarbon compounds can be added (grafted) to a hydroxy group of cellulose before grafting with hydrogenated cardanol.

When grafting treatment is performed by use of the acylated cellulose, the solvent to be selected preferably has a polarity value of (Relative Polarity) of 0.15 or more and 0.5 or less. Examples of the solvent satisfying the range include dioxane, tetrahydrofuran, ethyl acetate, chloroform, pyridine, methyl ethyl ketone, acetone, dimethylformamide and dimethylsulfoxide. These solvents may be used alone or as a mixture of two or more types. In the cases where a polarity value is less than 0.15 and larger than 0.5, the solubilities of acylated cellulose and a cellulose resin resulting from grafting treatment are low, with the result that reaction efficiency may significantly reduce. The polarity value refers to a value indicating how higher polarity the solvent has relative to water (polarity is 1) and defined in Solvents and Solvent Effects in Organic Chemistry, Wiley-VCH Publishers, 2rd ed., 1988, pp 359-373. Furthermore, when a solvent having a polarity value within the range and a specific gravity of 0.95 or less is used, the removal efficiency of impurities remaining in a product by filtration increases, with the result that a cellulose resin can be more easily produced. Examples of such a solvent include tetrahydrofuran, ethyl acetate, methyl ethyl ketone, acetone and dimethylformamide. These solvents may be used alone or as a mixture of two or more types.

When a catalyst is used in grafting treatment, if a catalyst inactivator is added, the remaining catalyst in a cellulose resin is inactivated, thereby improving e.g., stability against heat. As a means for inactivating a catalyst, adding an inactivator such as phosphoric acid, and adding a catalyst adsorbent such as porous silica are mentioned.

[Remaining Amount of Hydroxy Group]

The remaining hydroxy group that is not used in grafting hydrogenated cardanol is a hydroxy group without being modified, a modified hydroxy group by acetylation, or a hydroxy group to which a reactive hydrocarbon compound is added (grafted). As the amount of hydroxy group increases, maximum strength and heat resistance tend to increase; whereas water absorbability tends to increase. As the conversion rate (degree of substitution) of hydroxy groups increases, water absorbability tends to decrease, plasticity and breaking strain tend to increase; whereas, maximum strength and heat resistance tend to decrease. In consideration of these tendencies and grafting conditions, the conversion rate of hydroxy groups can be appropriately set.

In view of ensuring sufficient water resistance, the number of remaining hydroxy groups of a cellulose resin grafted per glucose unit (hydroxy group remaining degree, $DS_{OH}$) (average value) is preferably 0.9 or less and more preferably 0.7 or less.

[Degree of Substitution of Hydroxyl Groups by Acylation]

In view of water absorbability, mechanical strength and heat resistance, it is preferred that the hydroxy groups of cellulose are partly acylated with a reactive hydrocarbon as mentioned above. Furthermore, in view of the aforementioned grafting treatment of hydrogenated cardanol, it is preferred that hydroxy groups of cellulose are appropriately acylated (particularly, acetylated) before grafting of hydrogenated cardanol. The number of acyl groups ($DS_{AC}$) (average value) to be added per glucose unit of cellulose (or a derivative thereof), in other words, the number of hydroxy groups acylated (degree of substitution of hydroxy groups) (average value) is preferably 0.5 or more in view of obtaining sufficient acylation effect, more preferably 1.0 or more, and further preferably 1.5 or more. Furthermore, in view of ensuring the sufficient grafting rate ($DS_{CD}$) of hydrogenated cardanol, the degree of substitution of hydroxy groups, $DS_{AC}$ by acylation is preferably 2.7 or less, more preferably 2.5 or less and further preferably 2.2 or less. The acyl group to be added by acylation is preferably at least one acyl group selected from an acetyl group, a propionyl group and a butyryl group. Note that the degree of substitution by acetylation is represented by $DS_{Ace}$, the degree of substitution by propionation is represented by $DS_{Pr}$, and the degree of substitution by butylation is represented by $DS_{Bu}$.

[Plant Component Ratio]

In the cellulose resin according to the exemplary embodiment, in view of ensuring a sufficient plant utilization ratio, the mass ratio of the sum of a cellulose component and a cardanol component relative to the total cellulose resin after grafting (plant component ratio) is preferably 50% or more and more preferably 60% or more. Herein, the cellulose component corresponds to the structure represented by Formula (1) where the hydroxy groups are not acylated or grafted, whereas the cardanol component corresponds to the structure represented by Formula (2). On the assumption of these, calculation is made.

[Additives]

To the cellulose resin according to the exemplary embodiment described above, various types of additives usually used in thermoplastic resins can be applied. For example, if a plasticizer is added, thermoplasticity and breaking elongation can be more improved. Examples of such a plasticizer include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetylcitrate; epoxylated vegetable oils such as epoxylated soybean oil and epoxylated linseed oil; castor oil and a derivative thereof; benzoic acid esters such as ethyl O-benzoyl benzoate; aliphatic dicarboxylic acid esters such as sebacate and azelate; unsaturated dicarboxylic acid esters such as maleate; and N-ethyl toluene sulfonamide, triacetin, O-cresyl p-toluenesulfonate and tripropionin Of them, particularly, if a plasticizer such as dioctyl adipate, benzyl-2butoxyethoxyethyl adipate, tricresyl phosphate, diphenylcresyl phosphate and diphenyloctyl phosphate is added, not only thermoplasticity and elongation during breakage but also impact resistance can be effectively improved.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

The reactive functional group (a carboxylic acid group, a group derived from a carboxylic acid group, other functional groups) of such a plasticizer may be reacted with a hydroxy group or an unsaturated bond of cardanol to allow cardanol to add to a plasticizer. If such a plasticizer is used, compatibility of the cellulose resin of the exemplary embodiment and the plasticizer can be improved. Therefore, the addition effect of the plasticizer can be more improved.

To the cellulose resin of the exemplary embodiment, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils. Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

To the cellulose resin of the exemplary embodiment, if necessary, a flame retardant can be added. By adding a flame retardant, flame resistance can be imparted. Examples of the flame retardant include magnesium hydroxide, aluminum hydroxide, metal hydrates such as hydrotalcite, basic magnesium carbonate, calcium carbonate, silica, alumina, talc, clay, zeolite, bromine-based flame retardant, antimony trioxide, phosphoric acid based flame retardant (aromatic phosphate, aromatic condensed phosphate, etc.), compounds containing phosphorus and nitrogen (phosphazene compound), etc. These flame retardants can be used singly or in combination with two or more types.

Furthermore, as the flame retardant, a reaction product between a phosphorus oxide, a phosphoric acid or a derivative of each of these and cardanol, and a polymer of the reaction product can be used. If such a flame retardant is used, the interaction between the cellulose resin of the exemplary embodiment and a flame retardant is enhanced, excellent flame-retardant effect can be obtained. Examples of such a flame retardant include a reaction product between phosphorus oxide ($P_2O_5$) or phosphoric acid ($H_3PO_4$) and a hydroxy group of cardanol, and a polymer obtained by adding hexamethylene tetramine to the reaction product, followed by polymerizing.

To the cellulose resin of the exemplary embodiment, if necessary, an impact resistance improver can be added. By adding a impact resistance improver, impact resistance can be improved. Examples of the impact resistance improver include a rubber component and a silicone compound. Examples of the rubber component include a natural rubber, epoxylated natural rubber and synthesized rubber. Furthermore, examples of the silicone compound include organic polysiloxane formed by polymerization of alkyl siloxane, alkyl phenyl siloxane, etc., and modified silicone compounds obtained by modifying a side chain or an end of an organic polysiloxane as mentioned above with polyether, methylstyryl, alkyl, higher fatty acid ester, alkoxy, fluorine, an amino group, an epoxy group, a carboxyl group, a carbinol group, a methacryl group, a mercapto group, a phenol group etc. These impact resistance improvers can be used singly or in combination of two or more types.

As the silicone compound, a modified silicone compound (modified polysiloxane compound) is preferred. As the modified silicone compound, a modified polydimethyl siloxane is preferred, which has a structure having a main chain constituted of dimethyl siloxane repeat units and a side chain or a terminal methyl group partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group. The modified silicone compound, because of the presence of such an organic substituent, is improved in affinity for the aforementioned cardanol-added cellulose resin and dispersibility in the cellulose resin is improved. Consequently, a resin composition excellent in impact resistance can be obtained.

As such a modified silicone compound, a modified silicone compound produced in accordance with a conventional method can be used.

Examples of the organic substituent contained in the modified silicone compound include the organic substituents represented by the following formulas (3) to (21):

[Formula 3]

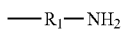  (3)

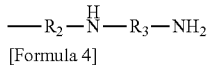  (4)

[Formula 4]

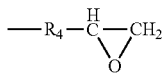  (5)

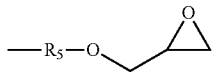  (6)

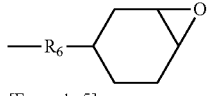  (7)

[Formula 5]

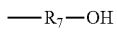  (8)

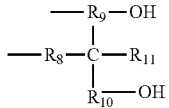  (9)

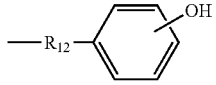  (10)

[Formula 6]

  (11)

[Formula 7]

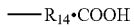  (12)

  (13)

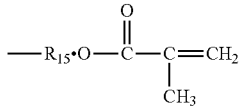  (14)

[Formula 8]

  (15)

[Formula 9]

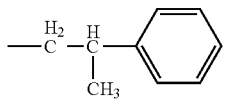

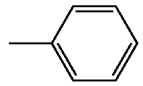  (16)

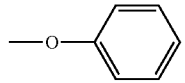  (17)

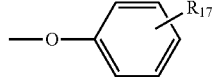  (18)

[Formula 10]

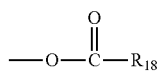  (19)

[Formula 11]

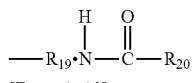  (20)

[Formula 12]

  (21)

where a and b each represent an integer of 1 to 50.

In the aforementioned formulas, $R_1$ to $R_{10}$, $R_{12}$ to $R_{15}$, $R_{19}$ and $R_{21}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —$(CH_2—CH_2—O)_c$— (c represents an integer from 1 to 50), and —$[CH_2—CH(CH_3)—O]_d$— (d represents an integer from 1 to 50); and —$(CH_2)_n$—NHCO— (e represents an integer from 1 to 8). Of these, an alkylene group is preferable and particularly, an ethylene group and a propylene group are preferable.

In the aforementioned formulas, $R_{11}$, $R_{16}$ to $R_{18}$, $R_{20}$ and $R_{22}$ each represent an alkyl group having at most 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

The total average content of organic substituents in a modified silicone compound desirably falls within the range where the modified silicone compound having an appropriate particle diameter (for example, 0.1 μm or more and 100 μm or less) can be dispersed in a matrix, i.e., a cardanol-added cellulose resin, during a process for producing a cellulose resin composition. If a modified silicone compound having an appropriate particle diameter is dispersed in a cardanol-added cellulose resin, stress concentration on the periphery of a silicone region having a low elastic modulus effectively occurs. As a result, a resin molded product having excellent impact resistance can be obtained. The total average content of such organic substituents is preferably 0.01% by mass or more and more preferably 0.1% by mass or more, and also preferably 70% by mass or less and more preferably 50% by mass or less. If an organic substituent is contained appropriately, the modified silicone compound can be improved in affinity for a cellulose resin, the modified silicone compound having an appropriate particle diameter can be dispersed in a cardanol-added cellulose resin, and further bleed out due to separation of the modified silicone compound in a molding can be suppressed. If the total average content of the organic substituents is excessively low, it becomes difficult to disperse a modified silicone compound having an appropriate particle diameter in a cardanol-added cellulose resin.

If an organic substituent of the modified polydimethyl siloxane compound is an amino group, an epoxy group, a carbinol group, a phenol group, a mercapto group, a carboxyl group or a methacryl group, the average content of the organic substituent in the modified polydimethyl siloxane compound can be obtained by the following Expression (I).

Organic substituent average content (%)=(organic substituent formula-weight/organic substituent equivalent)×100 (I)

In the Expression (I), the organic substituent equivalent is an average mass of a modified silicone compound per organic substituent (1 mole).

When the organic substituent of the modified polydimethyl siloxane compound is a phenoxy group, an alkylphenoxy group, a long-chain alkyl group, an aralkyl group, a long-chain fatty acid ester group or a long-chain fatty acid amide group, the average content of the organic substituent of the modified polydimethyl siloxane compound can be obtained from the following Expression (II).

Organic substituent average content (%)=$xx$
$w/[(1-x)\times74+xx(59+w)]\times100$ (II)

In the Expression (II), x is an average molar fraction of the organic substituent-containing a siloxane repeat unit relative to all siloxane repeat units of the modified polydimethyl siloxane compound; and w is the formula weight of the organic substituent.

In the case where the organic substituent of the modified polydimethyl siloxane compound is a phenyl group, the average content of the phenyl group in the modified polydimethyl siloxane compound can be obtained by the following Expression (III).

Phenyl group average content (%)=$154xx/[74\times(1-x)+198xx]\times100$ (III)

In the Expression (III), x is an average molar fraction of the phenyl group-containing siloxane repeat unit relative to all siloxane repeat units in the modified polydimethyl siloxane compound (A).

In the case where the organic substituent of the modified polydimethyl siloxane compound is a polyether group, the average content of the polyether group in the modified polydimethyl siloxane compound can be obtained by the following Expression (IV).

Polyether group average content (%)=$HLB$ value/20×100 (IV)

In the Expression (IV), the HLB value represents the degree of affinity of a surfactant for water and oil, and is defined by the following Expression (V) based on the Griffin Act.

$HLB$ value=20×(sum of formula weights of hydrophilic moieties/molecular weight) (V).

To the cellulose resin of the exemplary embodiment, two or more modified silicone compounds having different affinities to the resin may be added. In this case, dispersibility of a relative low-affinity modified silicone compound (A1) is improved by a relative high-affinity modified silicone compound (A2) to obtain a cellulose resin composition having even more excellent impact resistance. The total average content of an organic substituent of the relatively low-affinity modified silicone compound (A1) is preferably 0.01% by mass or more and more preferably 0.1% by mass or more and also preferably 15% by mass or less and more preferably 10% by mass or less. The total average content of an organic substituent of the relatively high-affinity modified silicone compound (A2) is preferably 15% by mass or more and more preferably 20% by mass or more and also preferably 90% by mass or less.

The blending ratio (mass ratio) of the modified silicone compound (A1) to the modified silicone compound (A2) can be set to fall within the range of 10/90 to 90/10.

In a modified silicone compound, dimethyl siloxane repeat units and organic substituent-containing siloxane repeat units each of which may be homologously and continuously connected, alternately connected or connected at random. A modified silicone compound may have a branched structure.

The number average molecular weight of a modified silicone compound is preferably 900 or more and more preferably 1000 or more, and also preferably 1000000 or less, more preferably 300000 or less and further preferably 100000 or less. If the molecular weight of a modified silicone compound is sufficiently large, loss by vaporization can be suppressed in kneading with a melted cellulose resin during a process for producing a cardanol-added cellulose resin compound. Furthermore, if the molecular weight of a modified silicone compound is appropriate (not excessively large), a uniform molding having good dispersibility can be obtained.

As the number average molecular weight, a value (calibrated by a polystyrene standard sample) obtained by measuring a 0.1% chloroform solution of a sample by GPC can be employed.

The addition amount of such a modified silicone compound is preferably, in view of obtaining sufficient addition effect, 1% by mass or more relative to the total cellulose resin composition and more preferably 2% by mass or more. In view of sufficiently ensuring properties of a cellulose resin such as strength and suppressing bleed out, the addition amount of a modified silicone compound is preferably 20% by mass or less and more preferably 10% by mass or less.

By adding such a modified silicone compound to a cellulose resin, the modified silicone compound having an appropriate particle diameter (for example, 0.1 to 100 μm) can be dispersed in the resin and the impact resistance of a resin composition can be improved.

As the impact resistance improver, a cardanol polymer containing cardanol as a main component may be used. Such a impact resistance improver has excellent compatibility with the cellulose resin of the exemplary embodiment and therefore a higher impact resistance improving effect can be obtained. Specific examples thereof include a cardanol polymer obtained by adding formaldehyde to cardanol and reacting this mixture with an unsaturated bond in the straight-chain hydrocarbon of cardanol; and a cardanol polymer obtained by adding a catalyst such as sulfuric acid, phosphoric acid or diethoxytrifluoroboron and reacting unsaturated bonds of the straight-chain hydrocarbon of cardanol with each other.

To the cellulose resin of the exemplary embodiment, if necessary, additives such as a colorant, an antioxidant and a heat stabilizer may be added as long as they are applied to conventional resin compositions.

To the cellulose resin of the exemplary embodiment, if necessary, a general thermoplastic resin may be added.

Particularly, by adding a thermoplastic resin having excellent flexibility such as a thermoplastic polyurethane elastomer (TPU), impact resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment. In view of ensuring the properties of a cellulose resin such as strength and suppressing bleed out, the addition amount of thermoplastic resin is preferably 20% by mass or less and more preferably 15% by mass or less.

The thermoplastic polyurethane elastomer (TPU) suitable for improving impact resistance that can be used includes a polyurethane elastomer prepared by from a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent impact resistance can be obtained.

These thermoplastic polyurethane elastomers (TPU) may be used singly or in combination.

A method for producing a resin composition containing the cellulose resin of the exemplary embodiment, additives and a thermoplastic resin, is not particularly limited. For example, the resin composition can be produced by melting and mixing additives and the cellulose resin manually by handmixing or by use of a known mixer such as a tumbler mixer, a ribbon blender, a single-axial or a multiaxial mixing extruder, and a compounding apparatus such as a kneader and kneading roll and, if necessary, granulating the mixture into an appropriate shape. In another preferable process, additives dispersed in solvent such as an organic solvent and a resin are mixed and furthermore, if necessary, a coagulation solvent is added to obtain a mixed composition of the additives and the resin and thereafter, the solvent is evaporated.

The cellulose resin according to the exemplary embodiments mentioned above can be used as a base resin for a molding material. The molding material using the cellulose resin as a base resin is suitable for forming a molded article such as housing, e.g., packaging for an electronic device.

The base resin herein refers to a main component of the molding material and means that other components may be contained as long as the components do not prevent the function of the main component. The content rate of the main component is not particularly limited; however, the content rate of the main component in a composition is 50% by mass or more, preferably 70% by mass or more, more preferably 80% by mass or more and particularly preferably 90% by mass or more.

EXAMPLES

The present invention will be more specifically described by way of examples below.

Synthesis Example 1

Preparation of Hydrogenated Cardanol (3-pentadecylcyclohexanol)

In a batch-system autoclave of 1.0 liter in internal volume, cardanol (20 g) obtained by distillation purification of cashew nut oil treated with heat, 2 g of ruthenium/carbon catalyst (Ru: 5% by mass) and tetrahydrofuran (20 mL) were placed and hydrogen was pushed in at 20 kgf/cm$^2$ (1.96×10$^6$ Pa) under room temperature and stirred at 80° C. for 3 hours to perform a hydrogenation reaction. Thereafter, the solution was taken out from the autoclave and filtered by use of a membrane filter made of Teflon (registered trade mark) and having an average pore size of 0.2 μm to remove the ruthenium/carbon catalyst. The obtained filtrate was treated under reduced pressure while heating to distill away tetrahydrofuran. As a result, hydrogenated cardanol (20.6 g) was obtained as a white solid substance at room temperature.

The purity of the obtained hydrogenated cardanol was measured by liquid chromatography (product name: LC-10ADVP manufactured by Shimadzu Corporation). The purity was 99% by mass.

Furthermore, the resultant hydrogenated cardanol was measured by $^1$H-NMR (product name: AV-400, 400 MHz, manufactured by Bruker). The hydrogenation rate (conversion rates of a double bond in the hydrocarbon moiety and a double bond of the aromatic ring) was 99 mol % or more.

Synthesis Example 2

Synthesis of Diisocyanate-Added Cardanol Derivative 1

The temperature of hexamethylene diisocyanate (HDI) (84.5 g (0.50 mol)) was raised to 50° C. while stirring. To this, hydrogenated cardanol (15.5 g (0.05 mol)) prepared in Synthesis Example 1 was added and continuously stirred at 80° C. for 3 hours. After the reaction solution was cooled to room temperature, acetonitrile (300 mL) was added. The reaction solution was allowed to stand still in a refrigerator overnight. Thereafter, a precipitated solid substance was separated by filtration and dried under vacuum to obtain a diisocyanate-added cardanol derivative in which HDI and hydrogenated cardanol were bound in a ratio of 1:1, as a white powder (18.2 g (0.04 mol)).

The obtained sample (diisocyanate-added cardanol derivative) was measured by liquid chromatography (product name: LC-10ADVP manufactured by Shimadzu Corporation). The purity was 92% by mass.

Furthermore, the solvent was distilled away from the filtrate by an evaporator to recover remaining HDI.

Synthesis Example 3

Synthesis of Diisocyanate-Added Cardanol Derivative 2

The temperature of tolylene diisocyanate (TDI) (28.2 g (0.16 mol)) was raised to 50° C. while stirring. To this, hydrogenated cardanol (25.0 g (0.08 mol)) prepared in Synthesis Example 1 was added and continuously stirred at 80° C. for one hour. After the reaction solution was cooled to room temperature, hexane (300 mL) was added. The reaction solution was allowed to stand still in a refrigerator overnight. Thereafter, a precipitated solid substance was separated by filtration and dried under vacuum to obtain diisocyanate-added cardanol derivative 2 in which TDI and hydrogenated cardanol were bound in a ratio of 1:1, as a white powder (20.6 g (0.04 mol)).

The obtained sample (diisocyanate-added cardanol derivative 2) was measured by liquid chromatography (product name: LC-10ADVP manufactured by Shimadzu Corporation). The purity was 98% by mass.

Furthermore, the solvent was distilled away from the filtrate by an evaporator to recover remaining TDI.

Synthesis Example 4

Synthesis of Chloridized and Monochloro Acetic Acid Modified Cardanol (Chloridized and Hydrogenated Cardanol) (Corresponding to Reference Synthesis Example 2 Described Later)

Hydrogenated cardanol (m-n-pentadecylphenol manufactured by ACROS Organics) in which an unsaturated bond of the straight-chain hydrocarbon moiety of cardanol is hydrogenated was used as a raw material. The phenolic hydroxy group of the hydrogenated cardanol was allowed to react with monochloro acetic acid for giving a carboxyl group to obtain carboxylated and hydrogenated cardanol. Subsequently, the carboxyl group was chloridized with oxalyl chloride to convert into an acid chloride group to obtain chloridized and hydrogenated cardanol. More specifically, chloridized and hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, a solution of monochloro acetic acid (66 g (0.70 mol)) manufactured by Kanto Chemical Co., Inc. dissolved in methanol (50 mL) was added dropwise at room temperature. After completion of dropwise addition, stirring was continued while refluxing at 73° C. for 4 hours. After the reaction solution was cooled to room temperature, the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The resultant ether layer was washed twice with distilled water (400 mL). To the ether layer, magnesium anhydride was added to dry the ether layer, which was then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain a white powder of carboxylated and hydrogenated cardanol (46 g (0.12 mol)).

The carboxylated and hydrogenated cardanol (46 g (0.12 mol)) thus obtained was dissolved in dehydrated chloroform (250 mL), and oxalyl chloride (24 g (0.19 mol)) and N,N-dimethylformamide (0.25 mL (3.2 mmol)) were added. The mixture was stirred for 72 hours at room temperature. Chloroform, excessive oxalyl chloride and N,N-dimethylformamide were distillated away under reduced pressure to obtain chloridized and hydrogenated cardanol (48 g (0.13 mol)).

Example 1

Diisocyanate-added cardanol derivative 1 prepared in Synthesis Example 2 was allowed to bind to cellulose acetate (trade name: L-70 manufactured by Daicel Chemical Industries, Ltd., the number of acetic acid groups added to a single glucose unit of cellulose (degree of substitution by acetylation: $DS_{Ace}$)=2.4) to obtain grafted cellulose acetate. More specifically, grafted cellulose acetate was prepared in accordance with the following procedure.

Cellulose acetate (10.0 g (the amount of hydroxy group: 0.023 mol)) was dissolved in dehydrated dioxane (200 mL), and dibutyl tin dilaurate (0.1 g) was added as a reaction catalyst. To the solution, a dioxane solution (100 mL) dissolving diisocyanate-added cardanol derivative 1 (13.7 g (0.029 mol)) prepared in Synthesis Example 2 was added and heated to reflux at 80° C. for 10 hours. The reaction solution was cooled to room temperature, and a precipitate was removed by filtration (suction filtration). The efficiency of the filtration at this time was evaluated in accordance with the following criteria. The results are shown in Table 4. In the filtration, a filter paper manufactured by Kiriyama Glass Co. (product name: Kiriyama filter, Form: No. 5B, retention particle size: 4 μm, diameter: 150 mm, thickness: 0.22 mm) was used.

(Evaluation Criteria)

◎: good (clogging of filter does not occur), ○: filterable (clogging of filter slightly occurs but filtration can be made), x: non-filterable.

The filtrate was slowly added dropwise to methanol (3 L) while stirring to allow reprecipitation, and a solid substance was separated by filtration. The solid substance separated by filtration was dried overnight in the air and further dried under vacuum at 105° C. for 5 hours to obtain grafted cellulose acetate (15.7 g).

The obtained sample (grafted cellulose acetate) was measured by $^1$H-NMR (product name: AV-400, 400 MHz, manufactured by Bruker), and $DS_{CD}$ was 0.57.

The process chart from raw-material cardanol until the sample is obtained (Synthesis Example 1→Synthesis Example 2→Example 1) is shown in FIG. 1.

Furthermore, the sample was evaluated in accordance with the following procedure. The results are shown in Table 1.

[Evaluation of Thermoplasticity (Press Moldability)]

Press molding was performed in the following conditions to obtain a molded product. At that time, moldability was evaluated in accordance with the following criteria.

(Molding Conditions)

Temperature: 200° C., Time: 2 minutes, Pressure: 100 kgf ($9.8 \times 10^2$ N),

Size of molded product: Thickness: 2 mm, Width: 13 mm, Length: 80 mm (Evaluation Criteria)

○: Good, Δ: not good (void, sink mark or partial uncharged portion was observed), x: cannot be molded.

[Measurement of Glass Transition Temperature (Heat Resistance Evaluation)]

Glass transition temperature was measured by DSC (product name: DSC6200, manufactured by Seiko Instruments Inc.).

[Bending Test]

The molded product obtained by the aforementioned molding process was subjected to a bending test in accordance with JIS K7171.

[Measurement of Water Absorption Rate]

Water absorption rate was measured in accordance with JIS K7209.

[Lightness of Color]

The molded product obtained by the aforementioned molding process was subjected to measurement of lightness L* (L*a*b* system: L*=0 to 100), which indicates whiteness of a color, by use of a spectrocolorimeter (JX777 (trade name) manufactured by Color Techno System Corporation, light source: D65/2°).

[Determination of Plant-Component Ratio]

A cellulose component and a cardanol component were regarded as plant components. The total content rate (% by mass) of the plant components relative to the whole sample was obtained. Assuming that the cellulose component herein corresponds to that having a structure represented by Formula (1) above in which a hydroxy group is not acylated or grafted, and that the cardanol component corresponds to that having a structure represented by Formula (2) above, calculation was made.

Example 2

Diisocyanate-added cardanol derivative 2 prepared in Synthesis Example 3 was allowed to bind to cellulose acetate (trade name: L-70, manufactured by Daicel Chemical Industries, Ltd., the number of acetic acid groups added to a single glucose unit of cellulose (degree of substitution by acetylation: $DS_{Ace}$)=2.4) to obtain grafted cellulose acetate. More specifically, the grafted cellulose acetate was prepared in accordance with the following procedure.

Cellulose acetate (10.0 g (hydroxy-group amount: 0.023 mol)) was dissolved in dehydrated dioxane (200 mL), and dibutyl tin dilaurate (0.1 g) was added as a reaction catalyst. To the solution, a dioxane solution (100 mL) dissolving diisocyanate-added cardanol derivative 2 (29.8 g (0.062 mol)) prepared in Synthesis Example 3 was added. The reaction solution was heated to reflux at 80° C. for 10 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (15.6 g).

The obtained sample (grafted cellulose acetate) was measured by $^1$H-NMR (product name: AV-400, 400 MHz, manufactured by Bruker), and $DS_{CD}$ was 0.55.

The process chart from raw-material cardanol until the sample is obtained (Synthesis Example 1→Synthesis Example 3→Example 2) is shown in FIG. 1.

Furthermore, the sample was evaluated in accordance with the same manner as in Example 1. The results are shown in Table 1.

Example 3

Diisocyanate-added cardanol derivative 1 prepared in Synthesis Example 2 was allowed to bind to cellulose acetate (the acetylation amount was controlled by a predetermined method, the number of acetic acid molecules added to a single glucose unit of cellulose (degree of substitution by acetylation: $DS_{Ace}$)=2.65) to obtain grafted cellulose acetate. More specifically, the grafted cellulose acetate was prepared in accordance with the following procedure.

Cellulose acetate (10.0 g (hydroxy-group amount: 0.013 mol)) was dissolved in dehydrated dioxane (200 mL), and dibutyl tin dilaurate (0.1 g) was added as a reaction catalyst. To the solution, a dioxane solution (100 mL) dissolving diisocyanate-added cardanol derivative 1 (9.1 g (0.019 mol)) prepared in Synthesis Example 2 was added. The reaction solution was heated to reflux at 80° C. for 10 hours. The reaction solution was cooled to room temperature and a precipitate was removed by filtration. The filtrate was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13.5 g).

The obtained sample (grafted cellulose acetate) was measured by $^1$H-NMR (product name: AV-400, 400 MHz, manufactured by Bruker), and $DS_{CD}$ was 0.33.

The process chart from raw-material cardanol until the sample is obtained (Synthesis Example 1→Synthesis Example 2→Example 3) is shown in FIG. 1.

Furthermore, the sample was evaluated in accordance with the same method as in Example 1. The results are shown in Table 2.

Example 4

Diisocyanate-added cardanol derivative 2 prepared in Synthesis Example 3 was allowed to bind to cellulose acetate (the acetylation amount was controlled by a predetermined method, the number of acetic acid molecules added to a single glucose unit of cellulose (degree of substitution by acetylation: $DS_{Ace}$)=2.65) to obtain grafted cellulose acetate. More specifically, the grafted cellulose acetate was prepared in accordance with the following procedure.

Cellulose acetate (10.0 g (hydroxy-group amount: 0.013 mol)) was dissolved in dehydrated dioxane (200 mL), and dibutyl tin dilaurate (0.1 g) was added as a reaction catalyst. To the solution, a dioxane solution (100 mL) dissolving diisocyanate-added cardanol derivative 2 (19.9 g (0.041 mol)) prepared in Synthesis Example 3 was added. The reaction solution was heated to reflux at 80° C. for 10 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13.6 g).

The obtained sample (grafted cellulose acetate) was measured by $^1$H-NMR (product name: AV-400, 400 MHz, manufactured by Bruker), and $DS_{CD}$ was 0.32.

The process chart from raw-material cardanol until the sample is obtained (Synthesis Example 1→Synthesis Example 3→Example 4) is shown in FIG. 1.

Furthermore, the sample was evaluated in accordance with the same method as in Example 1. The results are shown in Table 2.

Example 5

Diisocyanate-added cardanol derivative 1 prepared in Synthesis Example 2 was allowed to bind to cellulose acetate propionate (trade name: CAP-482-20, manufactured by Eastman Chemical Company, the number of acetic acid molecules added to a single glucose unit of cellulose (degree of substitution by acetylation: $DS_{Ace}$)=0.18; the number of propionic acid molecules added to a single glucose unit of cellulose (degree of substitution by propionation: $DS_{Pr}$)=2.49) to obtain grafted cellulose acetate propionate. More specifically, the grafted cellulose acetate propionate was prepared in accordance with the following procedure.

Cellulose acetate propionate (10.0 g (hydroxy-group amount: 0.013 mol)) was dissolved in dehydrated dioxane (200 mL), and dibutyl tin dilaurate (0.1 g) was added as a reaction catalyst. To the solution, a dioxane solution (100 mL) dissolving diisocyanate-added cardanol derivative 1 (7.7 g (0.016 mol)) prepared in Synthesis Example 2 was added. The reaction solution was heated to reflux at 80° C. for 6 hours. The reaction solution was cooled to room temperature and a precipitate was removed by filtration. The filtrate was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (12.5 g).

The obtained sample (grafted cellulose acetate propionate) was measured by $^1$H-NMR (product name: AV-400, 400 MHz, manufactured by Bruker), and $DS_{CD}$ was 0.23.

The process chart from raw-material cardanol until the sample is obtained (Synthesis Example 1→Synthesis Example 2→Example 5) is shown in FIG. 1.

Furthermore, the sample was evaluated in accordance with the same method as in Example 1. The results are shown in Table 3.

Example 6

Diisocyanate-added cardanol derivative 2 prepared in Synthesis Example 3 was allowed to bind to cellulose acetate propionate (trade name: CAP-482-20, manufactured by Eastman Chemical Company, the number of acetic acid molecules added to a single glucose unit of cellulose (degree of substitution by acetylation: $DS_{Ace}$)=0.18; the number of propionic acid molecules added to a single glucose unit of cellulose (degree of substitution by propionation: $DS_{Pr}$)=2.49) to obtain grafted cellulose acetate propionate. More specifically, the grafted cellulose acetate propionate was prepared in accordance with the following procedure.

Cellulose acetate propionate (10.0 g (hydroxy-group amount: 0.013 mol)) was dissolved in dehydrated dioxane (200 mL), and dibutyl tin dilaurate (0.1 g) was added as a reaction catalyst. To the solution, a dioxane solution (100 mL) dissolving diisocyanate-added cardanol derivative 2 (17.2 g (0.033 mol)) prepared in Synthesis Example 3 was added. The reaction solution was heated to reflux at 80° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (12.6 g).

The obtained sample (grafted cellulose acetate propionate) was measured by $^1$H-NMR (product name: AV-400, 400 MHz, manufactured by Bruker), and $DS_{CD}$ was 0.22.

The process chart from raw-material cardanol until the sample is obtained (Synthesis Example 1→Synthesis Example 3→Example 6) is shown in FIG. 1.

Furthermore, the sample was evaluated in accordance with the same method as in Example 1. The results are shown in Table 3.

Example 7

Diisocyanate-added cardanol derivative 1 prepared in Synthesis Example 2 was allowed to bind to cellulose acetate (trade name: L-70 manufactured by Daicel Chemical Industries, Ltd., the number of acetic acid molecules added to a single glucose unit of cellulose (degree of substitution by acetylation: $DS_{Ace}$)=2.4) to obtain grafted cellulose acetate. More specifically, grafted cellulose acetate was prepared in accordance with the following procedure.

Cellulose acetate (10.0 g (the amount of hydroxy group: 0.023 mol)) was dissolved in methyl ethyl ketone (200 mL), and dibutyl tin dilaurate (0.1 g) was added as a reaction catalyst. To the solution, a methyl ethyl ketone solution (100 mL) dissolving diisocyanate-added cardanol derivative 1 (13.7 g (0.029 mol)) prepared in Synthesis Example 2 was added and heated to reflux at 80° C. for 10 hours. To the reaction solution, a phosphoric acid powder (0.15 g) was added as a catalyst inactivator. After the reaction solution was heated to reflux at 80° C. for 30 minutes, the solution was cooled to room temperature and a precipitate was removed by filtration. The efficiency of the filtration at this time was evaluated in accordance with the same criteria as in Example 1. The results are shown in Table 4.

The solvent was removed from the filtrate under reduced pressure to recover a solid substance. The resultant solid substance was dried under vacuum at 105° C. for 5 hours to obtain grafted cellulose acetate (15.7 g).

The obtained sample (grafted cellulose acetate) was measured by $^1$H-NMR (product name: AV-400, 400 MHz, manufactured by Bruker), and $DS_{CD}$ was 0.57.

The process chart from raw-material cardanol until the sample is obtained (Synthesis Example 1→Synthesis Example 2→Example 7) is shown in FIG. 1.

Furthermore, the sample was evaluated in accordance with the same method as in Example 1. The results are shown in Table 1.

Example 8

Diisocyanate-added cardanol derivative 2 prepared in Synthesis Example 3 was allowed to bind to cellulose acetate (trade name: L-70, manufactured by Daicel Chemical Industries, Ltd., the number of acetic acid molecules added to a single glucose unit of cellulose (degree of substitution by acetylation: $DS_{Ace}$=2.4) to obtain grafted cellulose acetate. More specifically, the grafted cellulose acetate was prepared in accordance with the following procedure.

Cellulose acetate (10.0 g (hydroxy-group amount: 0.023 mol)) was dissolved in methyl ethyl ketone (200 mL), and dibutyl tin dilaurate (0.1 g) was added as a reaction catalyst. To the solution, a methyl ethyl ketone solution (100 mL) dissolving diisocyanate-added cardanol derivative 2 (29.8 g (0.062 mol)) prepared in Synthesis Example 3 was added. The reaction solution was heated to reflux at 80° C. for 10 hours. To the reaction solution, a phosphoric acid powder (0.15 g) was added as a catalyst inactivator. After the reaction solution was heated to reflux at 80° C. for 30 minutes, the solvent was removed under reduced pressure to recover a solid substance. The resultant solid substance was dried under vacuum at 105° C. for 5 hours to obtain grafted cellulose acetate (15.6 g).

The obtained sample (grafted cellulose acetate) was measured by $^1$H-NMR (product name: AV-400, 400 MHz, manufactured by Bruker), and $DS_{CD}$ was 0.55.

The process chart from raw-material cardanol until the sample is obtained (Synthesis Example 1→Synthesis Example 3→Example 8) is shown in FIG. 1.

Furthermore, the sample was evaluated in accordance with the same method as in Example 1. The results are shown in Table 1.

Examples 9 to 15

Diisocyanate-added cardanol derivative 1 prepared in Synthesis Example 2 was allowed to bind to cellulose acetate (trade name: L-70 manufactured by Daicel Chemical Industries, Ltd., the number of acetic acid molecules added to a single glucose unit of cellulose (degree of substitution by acetylation: $DS_{Ace}$=2.4) to obtain grafted cellulose acetate. More specifically, grafted cellulose acetate was prepared by use of each of the solvents shown in Table 4 in accordance with the following procedure.

Cellulose acetate (10.0 g (the amount of hydroxy group: 0.023 mol)) was dissolved in each of the solvents (200 mL) shown in Table 4, and dibutyl tin dilaurate (0.1 g) was added as a reaction catalyst. To the solution, the same type of solution (100 mL) dissolving diisocyanate-added cardanol derivative 1 (13.7 g (0.029 mol)) prepared in Synthesis Example 2 was added and heated to reflux at 80° C. for 10 hours. To the reaction solution, a phosphoric acid powder (0.15 g) was added as a catalyst inactivator. After the reaction solution was heated to reflux at 80° C. for 30 minutes, the solution was cooled to room temperature and a precipitate was removed by filtration. The efficiency of the filtration at this time was evaluated in accordance with the same criteria as in Example 1. The results are shown in Table 4.

The solvent was removed from the filtrate under reduced pressure to recover a solid substance. The resultant solid substance was dried under vacuum at 105° C. for 5 hours to obtain grafted cellulose acetate.

The obtained sample (grafted cellulose acetate) was measured by $^1$H-NMR (product name: AV-400, 400 MHz, manufactured by Bruker), and the results of $DS_{CD}$ are shown in Table 4.

The process chart from raw-material cardanol until the sample is obtained (Synthesis Example 1→Synthesis Example 2→Examples 9 to 15) is shown in FIG. 1.

Furthermore, the sample was evaluated in accordance with the same method as in Example 1. The results are shown in Table 5.

Reference Example 101

Chloridized and monochloro acetic acid modified cardanol (chloridized and hydrogenated cardanol) prepared in Synthesis Example 3 (Reference Synthesis Example 2) was allowed to bind to cellulose acetate (trade name: L-70 manufactured by Daicel Chemical Industries, Ltd., the number of acetic acid molecules added to a single glucose unit of cellulose (degree of substitution by acetylation: $DS_{Ace}$=2.4) to obtain grafted cellulose acetate. More specifically, grafted cellulose acetate was prepared in accordance with the following procedure.

Cellulose acetate (15.8 g (the amount of hydroxy group: 0.036 mol)) was dissolved in dehydrated dioxane (200 mL), and triethylamine (5.0 mL (0.036 mol)) was added as a reaction catalyst and an acid trapping agent. To the solution, a dioxane solution (100 mL) dissolving chloridized and hydrogenated cardanol (41.2 g (0.108 mol)) prepared in Synthesis Example 3 was added and heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.50.

Figure 2:
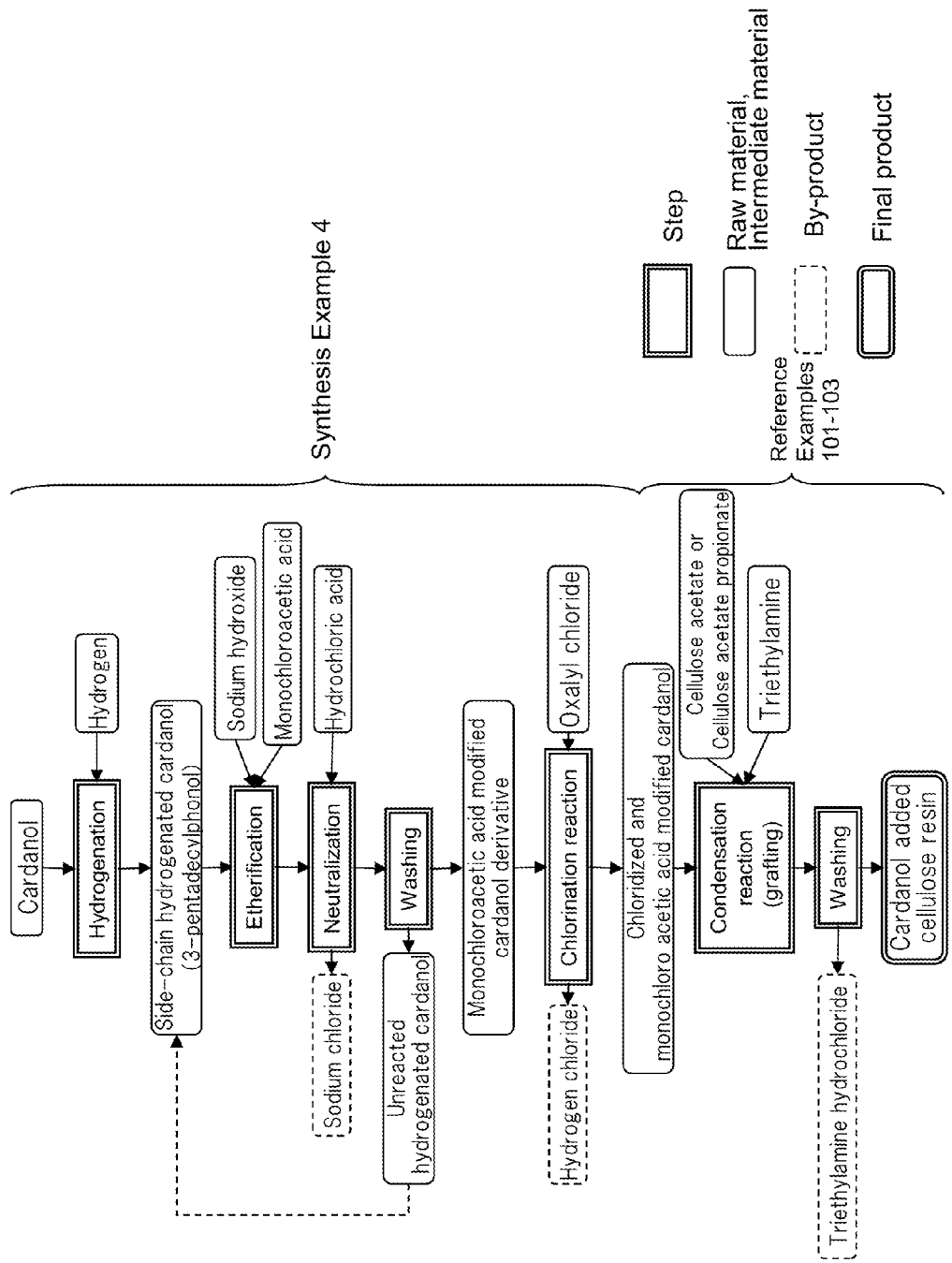
FIG. 2 is a process chart of a cellulose resin according to Reference Examples.

The process chart from raw-material cardanol until the sample is obtained (Synthesis Example 4→Reference Example 101) is shown in FIG. 2.

Furthermore, the sample was evaluated in accordance with the same method as in Example 1. The results are shown in Table 1.

Reference Example 102

Chloridized and monochloro acetic acid modified cardanol (chloridized and hydrogenated cardanol) prepared in Synthesis Example 4 (Reference Synthesis Example 2) was allowed to bind to cellulose acetate (the acetylation amount was controlled by a predetermined method. The number of acetic acid molecules added to a single glucose unit of cellulose (degree of substitution by acetylation: $DS_{Ace}$)= 2.65) to obtain grafted cellulose acetate. More specifically, grafted cellulose acetate was prepared in accordance with the following procedure.

Cellulose acetate (12 g (the amount of hydroxy group: 0.015 mol)) was dissolved in dehydrated dioxane (200 mL), and triethylamine (2.1 mL (0.015 mol)) was added as a reaction catalyst and an acid trapping agent. To the solution, a dioxane solution (100 mL) dissolving chloridized and hydrogenated cardanol (20.6 g (0.054 mol)) prepared in Synthesis Example 3 was added and heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.34.

The process chart from raw-material cardanol until the sample is obtained (Synthesis Example 4→Reference Example 102) is shown in FIG. 2.

Furthermore, the sample was evaluated in accordance with the same method as in Example 1. The results are shown in Table 2.

Reference Example 103

Corresponding to Reference Example 24 Described Later

Chloridized and monochloro acetic acid modified cardanol (chloridized and hydrogenated cardanol) prepared in Synthesis Example 4 (Reference Synthesis Example 2) was allowed to bind to cellulose acetate propionate (trade name: CAP-482-20, manufactured by Eastman Chemical Company, the number of acetic acid molecules added to a single glucose unit of cellulose (degree of substitution by acetylation: $DS_{Ace}$)=0.18; the number of propionic acid molecules added to a single glucose unit of cellulose (degree of substitution by propionation: $DS_{Pr}$)=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL), and triethylamine (2.5 mL (0.018 mol)) was added as a reaction catalyst and an acid trapping agent. To the solution, a dioxane solution (100 mL) dissolving chloridized and hydrogenated cardanol (13 g (0.035 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate) was measured by $^1$H-NMR (product name: AV-400, 400 MHz, manufactured by Bruker), and $DS_{CD}$ was 0.33.

The process chart from raw-material cardanol until the sample is obtained (Synthesis Example 4→Reference Example 103) is shown in FIG. 2.

Furthermore, the sample was evaluated in accordance with the same method as in Example 1. The results are shown in Table 3.

Reference Examples 104 to 106

Using solvents (toluene, isopropanol, 1-butanol) shown in Table 4, diisocyanate-added cardanol derivative 1 of Synthesis Example 2 was tried to bind to cellulose acetate (trade name: L-70 manufactured by Daicel Chemical Industries, Ltd., the number of acetic acid molecules added to a single glucose unit of cellulose (degree of substitution by acetylation: $DS_{Ace}$)=2.4). However, the solubilities of the reactant in the solvents were low and grafting was not sufficiently performed and thus, a desired grafted cellulose acetate was not obtained.

TABLE 1

|  |  | Example 1 | Example 2 | Example 7 | Example 8 | Reference Example 101 |
|---|---|---|---|---|---|---|
| Amount of acetyl group | $DS_{Ace}$ | 2.4 | 2.4 | 2.4 | 2.4 | 2.4 |
|  | Mass fraction (%) | 19 | 20 | 19 | 20 | 24 |
| Amount of cardanol derivative | $DS_{CD}$ modified with diisocyanate | HDI 0.57 | TDI 0.55 | HDI 0.57 | TDI 0.55 | 0 |
|  | $DS_{CD}$ modified with monochloro acetic acid | 0 | 0 | 0 | 0 | 0.50 |
|  | Mass fraction (%) | 51 | 50 | 51 | 50 | 40 |
| Addition amount of plasticizer (% by mass) |  | 0 | 0 | 0 | 0 | 0 |
| Bending strength (MPa) |  | 55 | 65 | 54 | 65 | 57 |
| Bending elasticity (GPa) |  | 1.4 | 1.7 | 1.4 | 1.7 | 1.5 |
| Bend-breaking strain (%) |  | >10 | >10 | >10 | >10 | >10 |
| Glass transition temperature (° C.) (heat resistance) |  | 139 | 146 | 140 | 145 | 142 |
| Thermoplasticity (press moldability) |  | ◯ | ◯ | ◯ | ◯ | ◯ |
| Water absorption rate (%) |  | 0.9 | 0.9 | 0.9 | 0.9 | 1.2 |
| Lightness of color (L*) |  | 68.8 | 60.4 | 67.8 | 60.9 | 5.9 |
| Plant component ratio (%) |  | 61 | 61 | 61 | 61 | 71 |

TABLE 2

|  |  | Example 3 | Example 4 | Reference Example 102 |
|---|---|---|---|---|
| Amount of acetyl group | $DS_{Ace}$ | 2.65 | 2.65 | 2.65 |
|  | Mass fraction (%) | 26 | 26 | 30 |
| Amount of cardanol derivative | $DS_{CD}$ modified with diisocyanate | 0.33 (HDI) | 0.32 (TDI) | 0 |
|  | $DS_{CD}$ modified with monochloro acetic acid-acid chloridized | 0 | 0 | 0.34 |
|  | Mass fraction (%) | 37 | 38 | 30 |
| Addition amount of plasticizer (% by mass) |  | 0 | 0 | 0 |
| Bending strength [MPa] |  | 90 | 98 | 91 |
| Bending elasticity [GPa] |  | 2.0 | 2.2 | 2.0 |
| Bend-breaking strain [%] |  | >10 | >10 | >10 |
| Glass transition temperature [° C.] (heat resistance) |  | 146 | 149 | 132 |
| Thermoplasticity (press moldability) |  | ○ | ○ | ○ |
| Water absorption rate [%] |  | 1.0 | 1.0 | 1.4 |
| Lightness of color [L*] |  | 70.3 | 62.2 | 13.5 |
| Plant component ratio [%] |  | 60 | 59 | 67 |

TABLE 3

|  |  | Example 5 | Example 6 | Reference Example 103 |
|---|---|---|---|---|
| Amount of acetyl group | $DS_{Ace}$ | 0.18 | 0.18 | 0.18 |
|  | Mass fraction (%) | 1.8 | 1.8 | 1.8 |
| Amount of propionyl group | $DS_{Pr}$ | 2.49 | 2.49 | 2.49 |
|  | Mass fraction (%) | 34 | 34 | 27 |
| Amount of cardanol derivative | $DS_{CD}$ modified with diisocyanate | 0.23 (HDI) | 0.22 (TDI) | 0 |
|  | $DS_{CD}$ modified with monochloro acetic acid-acid chloridized | 0 | 0 | 0.33 |
|  | Mass fraction (%) | 26 | 26 | 27 |
| Addition amount of plasticizer (% by mass) |  | 0 | 0 | 0 |
| Bending strength [MPa] |  | 64 | 86 | 49 |
| Bending elasticity [GPa] |  | 1.7 | 2.4 | 1.4 |
| Bend-breaking strain [%] |  | >10 | >10 | >10 |
| Glass transition temperature [° C.] (heat resistance) |  | 105 | 115 | 92 |
| Thermoplasticity (press moldability) |  | ○ | ○ | ○ |
| Water absorption rate [%] |  | 0.80 | 0.75 | 0.76 |
| Lightness of color [L*] |  | 69.1 | 61.1 | 16.7 |
| Plant component ratio [%] |  | 54 | 54 | 61 |

TABLE 4

|  | Type of solvent | Polarity value | Specific gravity | Filterability | $DS_{CD}$ of product |
|---|---|---|---|---|---|
| Example 1 | Dioxane | 0.164 | 1.033 | ○ | 0.57 |
| Example 9 | Tetrahydrofuran | 0.207 | 0.886 | ◉ | 0.54 |
| Example 10 | Ethyl acetate | 0.228 | 0.894 | ◉ | 0.55 |
| Example 11 | Chloroform | 0.259 | 1.498 | ○ | 0.56 |
| Example 12 | Pyridine | 0.302 | 0.982 | ○ | 0.53 |
| Example 7 | Methyl ethyl ketone | 0.327 | 0.805 | ◉ | 0.57 |
| Example 13 | Acetone | 0.355 | 0.786 | ◉ | 0.57 |
| Example 14 | Dimethylformamide | 0.386 | 0.944 | ◉ | 0.56 |
| Example 15 | Dimethylsulfoxide | 0.444 | 1.092 | ○ | 0.55 |
| Reference Example 104 | Toluene | 0.099 | 0.867 | — | — |
| Reference Example 105 | Isopropanol | 0.546 | 0.785 | — | — |
| Reference Example 106 | 1-Butanol | 0.654 | 0.81 | — | — |

TABLE 5

|  |  | Example 9 | Example 10 | Example 11 | Example 12 | Example 13 | Example 14 | Example 15 |
|---|---|---|---|---|---|---|---|---|
| Amount of acetyl group | $DS_{Ace}$ | 2.4 | 2.4 | 2.4 | 2.4 | 2.4 | 2.4 | 2.4 |
|  | Mass fraction (%) | 20 | 20 | 20 | 20 | 19 | 20 | 20 |
| Amount of cardanol derivative | $DS_{CD}$ modified with diisocyanate | HDI 0.54 | HDI 0.55 | HDI 0.56 | HDI 0.53 | HDI 0.57 | HDI 0.56 | HDI 0.55 |
|  | $DS_{CD}$ modified with monochloro acetic acid | 0 | 0 | 0 | 0 | 0 | 0 | 0 |
|  | Mass fraction (%) | 50 | 50 | 51 | 49 | 51 | 51 | 50 |
| Addition amount of plasticizer (% by mass) |  | 0 | 0 | 0 | 0 | 0 | 0 | 0 |
| Bending strength (MPa) |  | 55 | 56 | 55 | 55 | 54 | 55 | 55 |
| Bending elasticity (GPa) |  | 1.4 | 1.4 | 1.4 | 1.4 | 1.4 | 1.4 | 1.4 |
| Bend-breaking strain (%) |  | >10 | >10 | >10 | >10 | >10 | >10 | >10 |
| Glass transition temperature (° C.) (heat resistance) |  | 139 | 140 | 138 | 140 | 138 | 139 | 139 |
| Thermoplasticity (press moldability) |  | ○ | ○ | ○ | ○ | ○ | ○ | ○ |
| Water absorption rate (%) |  | 0.9 | 0.9 | 0.9 | 0.9 | 0.9 | 0.9 | 0.9 |
| Lightness of color (L*) |  | 69.1 | 69.0 | 68.8 | 68.9 | 68.3 | 68.4 | 68.6 |
| Plant component ratio (%) |  | 61 | 61 | 61 | 61 | 61 | 61 | 61 |

As is apparent from comparison between Examples 1, 2, 7 to 15 (cardanol added cellulose resins obtained by grafting using a diisocyanate compound) and Reference Example 101 (cardanol added cellulose resin obtained by grafting using monochloro acetic acid), it is found that the cardanol added cellulose resins of Examples 1, 2, 7 to 15 are greatly improved in lightness of color while keeping satisfactory strength, heat resistance (Tg) and water resistance. Furthermore, as is apparent from comparison between Examples 1, 2, 7 to 15 and Reference Examples 104 to 106, it is found that cardanol added cellulose resin can be easily produced with a high reaction rate by using a solvent having a polarity value of 0.15 or more and 0.5 or less.

Furthermore, as is apparent from comparison of process charts shown in FIG. 1 and FIG. 2, it is found that the cardanol added cellulose resins according to Examples 1 and 2 and Examples 7 to 15 can be produced with a few manufacturing steps without by-products and thus can be easily produced.

Examples 3 and 4 and Reference Example 102 are examples in which the number of acetyl groups added to the hydroxy group of cellulose is increased compared to Examples 1 and 2 and Reference Example 101. Even in this case, as is apparent from comparison between Examples 3 and 4 (cardanol added cellulose resins obtained by grafting using a diisocyanate compound) and Reference Example 102 (cardanol added cellulose resin obtained by grafting using monochloro acetic acid), it is found that the cardanol added cellulose resins of Examples 3 and 4 are greatly improved in lightness of color while keeping satisfactory strength, heat resistance (Tg) and water resistance.

Furthermore, as is apparent from comparison of process charts shown in FIG. 1 and FIG. 2, it is found that the cardanol added cellulose resins according to Examples 3 and 4 can be produced with a few manufacturing steps without by-products and thus can be easily produced.

Examples 5 and 6 and Reference Example 103 are examples of a cellulose resin prepared by using a cellulose derivative in which a propionyl group is added to a hydroxy group, in addition to an acetyl group. Even in this case, as is apparent from comparison between Examples 5 and 6 (cardanol added cellulose resins obtained by grafting using a diisocyanate compound) and Reference Example 103 (cardanol added cellulose resin obtained by grafting using monochloro acetic acid), it is found that the cardanol added cellulose resins of Examples 5 and 6 are greatly improved in lightness of color while keeping satisfactory strength, heat resistance (Tg) and water resistance.

Furthermore, as is apparent from comparison of process charts shown in FIG. 1 and FIG. 2, it is found that the cardanol added cellulose resins according to Examples 5 and 6 can be produced with a few manufacturing steps without by-products and thus can be easily produced.

In addition, a cardanol added cellulose resin obtained by grafting using a compound other than a diisocyanate compound will be more specifically described by use of specific examples.

Reference Synthesis Example 1

Cardanol Derivative 1 (Preparation of Chloridized and Succinic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. When the hydrogenated cardanol was measured by $^1$H-NMR (product name: AV-400, 400 MHz, manufactured by Bruker), no unsaturated bond was detected. Thus, it was confirmed that a hydrogenation rate is at least 90% by mole or more. The phenolic hydroxy group of the cardanol was reacted with succinic anhydride to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, succinic anhydride (33 g (0.33 mol)) was dissolved in dehydrated chloroform (250 mL). To this, dehydrated pyridine (5.0 mL (0.062 mol)) and a raw material, i.e., hydrogenated cardanol (50 g (0.16 mol)) were added. The reaction solution was heated to reflux under a nitrogen atmosphere at 70° C. for 24 hours, cooled to room temperature. Thereafter, a crystal of succinic anhydride precipitated was separated by filtration. The chloroform solution filtrated was washed twice with 0.1 mol/L hydrochloric acid (250 mL) and further washed twice with water (250 mL). After washing, the chloroform solution was dehydrated with magnesium sulfate and magnesium sulfate was separated by filtration and chloroform was distilled away under reduced pressure to obtain a brown solid substance of carboxylated and hydrogenated cardanol (60 g (0.15 mol)).

The resultant carboxylated and hydrogenated cardanol (50 g (0.12 mol)) was dissolved in dehydrated chloroform (250 mL). To this, oxalyl chloride (24 g (0.19 mol)) and N,N-dimethylformamide (0.25 mL (3.2 mmol)) were added. The reaction solution was stirred at room temperature for 72 hours. Chloroform, excessive oxalyl chloride and N,N-dimethylformamide were distillated away under reduced pressure to obtain chloridized and hydrogenated cardanol (52 g (0.12 mol)).

Reference Synthesis Example 2

Cardanol Derivative 2 (Preparation of Chloridized and Monochloroacetic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, at room temperature, a solution of monochloro acetic acid (66 g (0.70 mol)) (manufactured by Kanto Chemical Co., Inc.) dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL)

were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The resultant carboxylated and hydrogenated cardanol (46 g (0.12 mol)) was dissolved in dehydrated chloroform (250 mL). To this, oxalyl chloride (24 g (0.19 mol)) and N,N-dimethylformamide (0.25 mL (3.2 mmol) were added. The mixture was stirred at room temperature for 72 hours. Chloroform, excessive oxalyl chloride and N,N-dimethylformamide were distillated away under reduced pressure to obtain chloridized and hydrogenated cardanol (48 g (0.13 mol)).

Reference Synthesis Example 3

Preparation of Biphenylacetyl Chloride

Biphenylacetic acid (6.0 g (0.028 mol)) manufactured by Sigma-Aldrich Co. LLC was dissolved in dehydrated chloroform (60 ml). To this, oxalyl chloride (3.7 g (0.029 mol)) and N,N-dimethylformamide (0.04 ml (0.51 mmol)) were added. The mixture was stirred at room temperature for 72 hours. Chloroform, excessive oxalyl chloride and N,N-dimethylformamide were distillated away under reduced pressure to obtain biphenylacetyl chloride (6.5 g (0.028 mol)).

Reference Example 1

The chloridized and hydrogenated cardanol (cardanol derivative 1) prepared in Reference Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (46 g (0.11 mol)) prepared in Reference Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (20 g).

The obtained sample (grafted cellulose acetate) was measured by $^1$H-NMR (product name: AV-400, 400 MHz, manufactured by Bruker), and $DS_{CD}$ was 0.90.

Furthermore, the sample was evaluated in the following procedure. The results are shown in Table 101A.

[Evaluation of Thermoplasticity (Press Moldability)]
Press molding was performed in the following conditions to obtain a molded product. At that time, moldability was evaluated in accordance with the following criteria.
(Molding Conditions)
Temperature: 170° C., Time: 2 minutes, Pressure: 100 kgf ($9.8 \times 10^2$ N),
Size of molded product: Thickness: 2 mm, Width: 13 mm, Length: 80 mm
(Evaluation Criteria)
◯: Good, Δ: not good (void, sink mark or partial uncharged portion was observed), x: cannot be molded.
[Measurement of Glass Transition Temperature (Heat Resistance Evaluation)]
Glass transition temperature was measured by DSC (product name: DSC6200, manufactured by Seiko Instruments Inc.).
[Bending Test]
The molded product obtained by the aforementioned molding process was subjected to a bending test in accordance with JIS K7171.
[Tensile Test]
A solution of a sample (2 g) dissolved in chloroform (20 mL) was prepared. The solution was subjected to casting and a film of 10 mm in width, 60 mm in length and 0.2 mm in thickness was prepared by cutting out by a cutter knife. The film was subjected to a tensile test in accordance with JIS K7127.
[Measurement of Water Absorption Rate]
Water absorption rate was obtained by measurement in accordance with JIS K7209.
[Determination of Plant-Component Ratio]
A cellulose component and a cardanol component were regarded as plant components. The total content rate (% by mass) of the plant components relative to the whole sample was obtained. Assuming that the cellulose component herein corresponds to that having a structure represented by Formula (1) above in which a hydroxy group is not acylated or grafted, and that the cardanol component corresponds to that having a structure represented by Formula (2) above, calculation was made.

Reference Example 2

The chloridized and hydrogenated cardanol (cardanol derivative 1) prepared in Reference Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (23 g (0.054 mol)) prepared in Reference Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.55.

Furthermore, the sample was evaluated in the same manner as in Reference Example 1. The results are shown in Table 101A.

Reference Example 3

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (14 g (0.037 mol)) prepared in Reference Synthesis Example 2 was added. The reaction solution was heated to reflux at 100° C. for 3 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (15 g).

The obtained sample (grafted cellulose acetate) was measured by $^1$H-NMR (product name: AV-400, 400 MHz, manufactured by Bruker), and $DS_{CD}$ was 0.55.

Furthermore, the sample was evaluated in the same manner as in Reference Example 1. The results are shown in Table 101A.

Reference Example 4

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of the chloridized and hydrogenated cardanol was changed to 21 g (0.054 mol) to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.80.

Furthermore, the sample was evaluated in the same manner as in Reference Example 1. The results are shown in Table 101A.

Reference Example 5

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of chloridized and hydrogenated cardanol was changed to 12 g (0.031 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.44.

Furthermore, the sample was evaluated in the same manner as in Reference Example 1. The results are shown in Table 101A.

Reference Example 6

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of the chloridized and hydrogenated cardanol was changed to 6.9 g (0.018 mol) to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.30.

Furthermore, the sample was evaluated in the same manner as in Reference Example 1. The results are shown in Table 101A.

Reference Example 7

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.1 g (0.011 mol)) prepared in Reference Synthesis Example 2 and benzoyl chloride (BC) (2.8 g (0.020 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.30 and $DS_{BC}$ was 0.14.

Furthermore, the sample was evaluated in the same manner as in Reference Example 1. The results are shown in Table 101B.

Reference Example 8

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 3.1 g (0.008 mol) and the supply amount of benzoyl chloride was changed to 8.4 g (0.060 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.22 and $DS_{BC}$ was 0.27.

Furthermore, the sample was evaluated in the same manner as in Reference Example 1. The results are shown in Table 101B.

Reference Example 9

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 7.6 g (0.020 mol) and the supply amount of benzoyl chloride was changed to 8.4 g (0.060 mol) to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.44 and $DS_{BC}$ was 0.22.

Furthermore, the sample was evaluated in the same manner as in Reference Example 1. The results are shown in Table 101B.

Reference Example 10

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 4.1 g (0.011 mol) and the supply amount of benzoyl chloride was changed to 28.1 g (0.20 mol) to obtain grafted cellulose acetate (15 g).

The obtained sample (grafted cellulose acetate) was measured by $^1$H-NMR (product name: AV-400, 400 MHz, manufactured by Bruker), and $DS_{CD}$ was 0.24 and $DS_{BC}$ was 0.42.

Furthermore, the sample was evaluated in the same manner as in Reference Example 1. The results are shown in Table 101B.

Reference Example 11

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 4.6 g (0.012 mol) and the supply amount of benzoyl chloride was changed to 1.1 g (0.008 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.30 and $DS_{BC}$ was 0.07.

Furthermore, the sample was evaluated in the same manner as in Reference Example 1. The results are shown in Table 101B.

Reference Example 12

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 1.5 g (0.004 mol) and the supply amount of benzoyl chloride was changed to 2.2 g (0.016 mol) to obtain grafted cellulose acetate (12 g).

The obtained sample (grafted cellulose acetate) was measured by $^1$H-NMR (product name: AV-400, 400 MHz, manufactured by Bruker), and $DS_{CD}$ was 0.08 and $DS_{BC}$ was 0.16.

Furthermore, the sample was evaluated in the same manner as in Reference Example 1. The results are shown in Table 101B.

Reference Example 13

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (7.0 g (0.018 mol)) prepared in Reference Synthesis Example 2 and biphenylacetyl chloride (BAA) (1.5 g (0.0065 mol)) prepared in Reference Synthesis Example 3 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.27 and $DS_{BAA}$ was 0.15.

Furthermore, the sample was evaluated in the same manner as in Reference Example 1. The results are shown in Table 101B.

Reference Example 14

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, preparation was made in accordance with the same content and manner as in Reference Example 13 except that the supply amount of the chloridized and hydrogenated cardanol was changed to 12.2 g (0.032 mol) and the supply amount of biphenylacetyl chloride was changed to 4.6 g (0.020 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.40 and $DS_{BAA}$ was 0.40.

Furthermore, the sample was evaluated in the same manner as in Reference Example 1. The results are shown in Table 101B.

Reference Example 15

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, preparation was made in accordance with the same content and manner as in Reference Example 13 except that the supply amount of the chloridized and hydrogenated cardanol was changed to 15.2 g (0.040 mol) and the supply amount of biphenylacetyl chloride was changed to 3.2 g (0.014 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.55 and $DS_{BAA}$ was 0.28.

Furthermore, the sample was evaluated in the same manner as in Reference Example 1. The results are shown in Table 101B.

Reference Example 16

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, preparation was made in accordance with the same content and manner as in Reference Example 13 except that the supply amount of the chloridized and hydrogenated cardanol was changed to 7.6 g (0.020 mol) and the supply amount of biphenylacetyl chloride was changed to 7.4 g (0.032 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.30 and $DS_{BAA}$ was 0.52.

Furthermore, the sample was evaluated in the same manner as in Reference Example 1. The results are shown in Table 101B.

Reference Example 17

The chloridized and hydrogenated cardanol (cardanol derivative 2) prepared in Reference Synthesis Example 2 and phenylpropionyl chloride (PPA) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.0 g (0.011 mol)) prepared in Reference Synthesis Example 2 and phenylpropionyl chloride (PPA) (2.0 g (0.012 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.17 and $DS_{PPA}$ was 0.25.

Furthermore, the sample was evaluated in the same manner as in Reference Example 1. The results are shown in Table 101C.

Reference Example 18

The chloridized and hydrogenated cardanol (cardanol derivative 2) prepared in Reference Synthesis Example 2 and phenylpropionyl chloride (PPA) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 17 except that the supply amount of the chloridized and hydrogenated cardanol was changed to 3.8 g (0.010 mol) and the supply amount of phenylpropionyl chloride was changed to 2.7 g (0.016 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.13 and $DS_{PPA}$ was 0.35.

Furthermore, the sample was evaluated in the same manner as in Reference Example 1. The results are shown in Table 101C.

Reference Example 19

The chloridized and hydrogenated cardanol (cardanol derivative 2) prepared in Reference Synthesis Example 2 and cyclohexanecarboxylic acid chloride (CHC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (3.7 g (0.0096 mol)) prepared in Reference Synthesis Example 2 and cyclohexanecarboxylic acid chloride (CHC) (2.5 g (0.017 mol)) manufactured by Sigma-Aldrich Co. LLC was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.20 and $DS_{CHC}$ was 0.22.

Furthermore, the sample was evaluated in the same manner as in Reference Example 1. The results are shown in Table 101C.

Reference Example 20

The chloridized and hydrogenated cardanol (cardanol derivative 2) prepared in Reference Synthesis Example 2 and biphenylcarbonyl chloride (BCC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS^{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.6 g (0.012 mol)) prepared in Reference Synthesis Example 2 and biphenylcarbonyl chloride (BCC) (13.0 g (0.060 mol)) manufactured by Sigma-Aldrich Co. LLC was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.30 and $DS_{BCC}$ was 0.30.

Furthermore, the sample was evaluated in the same manner as in Reference Example 1. The results are shown in Table 101C.

Reference Example 21

The chloridized and hydrogenated cardanol (cardanol derivative 2) prepared in Reference Synthesis Example 2 was allowed to bind to cellulose acetate (trade name: LM-40, manufactured by Daicel Chemical Industries, Ltd., the number of acetic acid molecules added to a single glucose unit of cellulose (degree of acetylation: $DS_{Ace}$)=2.4) to obtain grafted cellulose acetate. More specifically, the grafted cellulose acetate was prepared in accordance with the following procedure.

Cellulose acetate (15.8 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (6.8 g (0.018 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.19.

Furthermore, the sample was evaluated in the same manner as in Reference Example 1. The results are shown in Table 102.

Reference Example 22

The chloridized and hydrogenated cardanol (cardanol derivative 2) prepared in Reference Synthesis Example 2 was allowed to bind to cellulose acetate (trade name: L-40, manufactured by Daicel Chemical Industries, Ltd., the number of acetic acid molecules added to a single glucose unit of cellulose (degree of acetylation: $DS_{Ace}$)=2.4) to obtain grafted cellulose acetate. More specifically, grafted cellulose acetate (25 g) was prepared in accordance with the same content and manner as in Reference Example 21 except that the supply amount of chloridized and hydrogenated cardanol was changed to 41.2 g (0.108 mol).

The obtained sample (grafted cellulose acetate) was measured by $^1$H-NMR (product name: AV-400, 400 MHz, manufactured by Bruker), and $DS_{CD}$ was 0.50.

Furthermore, the sample was evaluated in the same manner as in Reference Example 1. The results are shown in Table 102.

Reference Example 23

The chloridized and hydrogenated cardanol (cardanol derivative 2) prepared in Reference Synthesis Example 2 was allowed to bind to cellulose acetate butyrate (trade name: CAB-381-20, manufactured by Eastman Chemical Company, the number of acetic acid molecules added to a single glucose unit of cellulose (degree of acetylation: $DS_{Ace}$)=1.0; the number of butyric acid molecules added to a single glucose unit of cellulose (degree of butyration: $DS_{Bu}$)=1.66) to obtain grafted cellulose acetate butyrate. More specifically, the grafted cellulose acetate butyrate was prepared in accordance with the following procedure.

Cellulose acetate butyrate (10 g (hydroxy-group amount: 0.011 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (13 g (0.035 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate butyrate (13 g).

The obtained sample (grafted cellulose acetate butyrate) was measured by $^1$H-NMR (product name: AV-400, 400 MHz, manufactured by Bruker), and $DS_{CD}$ was 0.34.

Furthermore, the sample was evaluated in the same manner as in Reference Example 1. The results are shown in Table 103.

Reference Example 24

The chloridized and hydrogenated cardanol (cardanol derivative 2) prepared in Reference Synthesis Example 2 was allowed to bind to cellulose acetate propionate (trade name: CAP-482-20, manufactured by Eastman Chemical Company, the number of acetic acid molecules added to a single glucose unit of cellulose (degree of acetylation: $DS_{Ace}$)=0.18; the number of propionic acid molecules added to a single glucose unit of cellulose (degree of propionation: $DS_{Pr}$)=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (13 g (0.035 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate) was measured by $^1$H-NMR (product name: AV-400, 400 MHz, manufactured by Bruker), and $DS_{CD}$ was 0.33.

Furthermore, the sample was evaluated in the same manner as in Reference Example 1. The results are shown in Table 103.

Reference Example 25

The chloridized and hydrogenated cardanol (cardanol derivative 2) prepared in Reference Synthesis Example 2 and benzoyl chloride (BC) as a reactive hydrocarbon were allowed to bind to cellulose acetate propionate (trade name: CAP-482-20, manufactured by Eastman Chemical Company, the number of acetic acid molecules added to a single glucose unit of cellulose (degree of acetylation: $DS_{Ace}$)= 0.18; the number of propionic acid molecules added to a single glucose unit of cellulose (degree of propionation: $DS_{Pr}$)=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (4.5 g (0.012 mol)) prepared in Reference Synthesis Example 2 and benzoyl chloride (BC) (2.8 g (0.020 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate) was measured by $^1$H-NMR (product name: AV-400, 400 MHz, manufactured by Bruker), and $DS_{CD}$ was 0.21 and $DS_{BC}$ was 0.10.

Furthermore, the sample was evaluated in the same manner as in Reference Example 1. The results are shown in Table 103.

Reference Example 26

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. More specifically, the carboxylated and hydrogenated cardanol was prepared in accordance with the following procedure.

First, hydrogenated cardanol (80 g (0.26 mol)) was dissolved in methanol (120 mL). To this, an aqueous solution dissolving sodium hydroxide (64 g (1.6 mol)) in distilled water (40 mL) was added. Thereafter, at room temperature, a solution of monochloro acetic acid (66 g (0.70 mol)) manufactured by Kanto Chemical Co., Inc. dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The carboxylated and hydrogenated cardanol thus prepared was allowed to bind to cellulose (trade name: KC Flock W-50G manufactured by Nippon Paper Chemicals) to obtain grafted cellulose. More specifically, the grafted cellulose was prepared in accordance with the following procedure.

Cellulose (2.5 g (hydroxy-group amount: 47 mmol)) was suspended in methanol (100 mL) and stirred for one hour at room temperature and filtrated by suction. The solid substance separated by filtration was allowed to swell with dimethylacetamide (DMAc) (100 mL), stirred one hour at room temperature and filtrated by suction to remove the solvent. Thereafter, swelling with DMAc and solvent removal by suction filtration were repeated three times in the same manner. LiCl (21 g) was dissolved in DMAc (250 mL) and the DMAc-swollen cellulose previously obtained was mixed and stirred at room temperature overnight to obtain a cellulose solution. To the cellulose solution thus obtained, a DMAc solution (20 mL) dissolving the carboxylated and hydrogenated cardanol (17.3 g (46.5 mmol)), pyridine (11.0 g (140 mmol)) and tosyl chloride (8.8 g (46 mmol)) was added. The reaction solution was reacted by heating at 50° C. for one hour. The reaction solution was added dropwise to methanol (2 L) to allow reprecipitation. The resultant solid substance was separated by filtration, washed three times with methanol (500 mL) and dried under vacuum at 105° C. for 5 hours to obtain grafted cellulose (10.4 g). $DS_{CD}$ was obtained from the yield, and $DS_{CD}$ was 1.49. Furthermore, the sample was evaluated in the same manner as in Reference Example 1. The results are shown in Table 104.

Reference Comparative Example 1

The same cellulose acetate before grafting as that used in Reference Example 1 was used as a comparative sample.

The cellulose acetate was evaluated in the same manner as in Reference Example 1. The results are shown in Table 101C.

Note that the cellulose acetate did not melt even if heated and did not exhibit thermoplasticity. Furthermore, since the cellulose acetate could not be molded, a bending test was not performed.

Reference Comparative Example 2

To the same cellulose acetate before grafting as that used in Reference Example 1, triethyl citrate (trade name: Citroflex-2 manufactured by Pfizer Inc.) was added as a plasticizer such that the content became 45% by mass based on the whole resin composition. This was mixed by an extruder mixer (HAAKE MiniLab Rheomex extruder (Model CTW5, Thermo Electron Corp., Waltham, Mass.)) at a temperature of 200° C. and a screw rotation speed of 60 rpm to prepare a cellulose acetate resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 3

A cellulose acetate resin composition was prepared in accordance with the same content and manner as in Reference Comparative Example 2 except that the addition amount of triethyl citrate was set to 56% by mass based on the whole resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 4

A cellulose acetate resin composition was prepared in accordance with the same content and manner as in Reference Comparative Example 2 except that the addition amount of triethyl citrate was set to 34% by mass based on the whole resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 5

Phenylpropionyl chloride (PPA) was used as a reactive hydrocarbon and allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving phenylpropionyl chloride (PPA) (10 g (0.060 mol)) manufactured by Tokyo Kasei Kogyo Co., Ltd., was added. The reaction solution was heated to reflux at 100° C. for one hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (12 g).

The obtained sample (grafted cellulose acetate) was measured by $^1$H-NMR (product name: AV-400, 400 MHz, manufactured by Bruker), and $DS_{PPA}$ was 0.47.

The sample was evaluated in the same manner as in Reference Example 1. The results are shown in Table 101C.

Note that the cellulose acetate did not melt even if heated and did not exhibit thermoplasticity. Furthermore, since the cellulose acetate could not be molded, a bending test was not performed.

Reference Comparative Example 6

The same cellulose acetate before grafting ($DS_{Ace}$=2.4) as that used in Reference Example 21 was used as a comparative sample.

The cellulose acetate was evaluated in the same manner as in Reference Example 1. The results are shown in Table 102.

Note that the cellulose acetate did not melt even if heated and did not exhibit thermoplasticity. Furthermore, since the cellulose acetate could not be molded, a bending test was not performed.

Reference Comparative Example 7

To the same cellulose acetate ($DS_{Ace}$=2.4) before grafting as that used in Reference Example 21, triethyl citrate (trade name: Citroflex-2 manufactured by Pfizer Inc.) was added as a plasticizer such that the content became 20% by mass based on the whole resin composition. This was mixed by an extruder mixer (HAAKE MiniLab Rheomex extruder (Model CTW5, Thermo Electron Corp., Waltham, Mass.)) at a temperature of 190° C. and a screw rotation speed of 60 rpm) to prepare a cellulose acetate resin composition.

The resin composition was evaluated in the same manner as in Reference Example 1. The results are shown in Table 102.

Note that when the resin composition was casted, a phase separation occurred and a uniform film could not be prepared. Thus, a tensile test was not performed.

Reference Comparative Example 8

A cellulose acetate resin composition was prepared in accordance with the same content and manner as in Reference Comparative Example 7 except that the addition amount of triethyl citrate was set to 40% by mass based on the whole resin composition.

The resin composition was evaluated in the same manner as in Reference Example 1. The results are shown in Table 102.

Note that when the resin composition was casted, a phase separation occurred and a uniform film could not be prepared. Thus, a tensile test was not performed.

Reference Comparative Examples 9 and 10

The same cellulose acetate butyrate and cellulose acetate propionate before grafting as those that used in Reference Examples 23 and 24 were used as comparative samples respectively.

The cellulose acetate butyrate and cellulose acetate propionate were evaluated in the same manner as in Reference Example 1. The results are shown in Table 103.

Note that the cellulose acetate butyrate and cellulose acetate propionate melted when heated. They had thermoplasticity; however, melt viscosity was extremely large. Since it was difficult to mold them, a bending test was not performed.

Reference Comparative Examples 11 and 12

To each of the same cellulose acetate butyrate and cellulose acetate propionate before grafting as those used in Reference Examples 23 and 24 respectively, triethyl citrate (trade name: Citroflex-2 manufactured by Pfizer Inc.) was added as a plasticizer such that the content became 27% by mass based on the whole resin composition. This was mixed by an extruder mixer (HAAKE MiniLab Rheomex extruder (Model CTW5, Thermo Electron Corp., Waltham, Mass.)) at a temperature of 180° C. and a screw rotation speed of 60 rpm to prepare a cellulose acetate butyrate resin composition and a cellulose acetate propionate resin composition.

The resin compositions were evaluated in the same manner as in Reference Example 1. The results are shown in Table 103.

Note that when each of the resin compositions was casted, a phase separation occurred and a uniform film could not be prepared. Thus, a tensile test was not performed.

Reference Comparative Example 13

To compare with Reference Example 26, a resin composition composed of cellulose acetate and triethyl citrate as a plasticizer was prepared in accordance with the same manner as in Reference Comparative Example 2 except that the addition amount of the plasticizer was changed to 63% by mass based on the whole resin composition. The total amount of plasticizer and acetyl group was set to be equal to the amount of cardanol of Reference Example 26. The resin composition was evaluated in the same manner as in Reference Example 1. The results are shown in Table 104.

Note that when the resin composition was casted, a phase separation occurred and a uniform film could not be prepared. Thus, a tensile test was not performed.

Reference Comparative Example 14

An unsaturated bond of cardanol represented by the above Formula (2) (LB-7000: a mixture of 3-pentadecylphenol (about 5%), 3-pentadecylphenol monoene (about 35%), 3-pentadecylphenol diene (about 20%), 3-pentadecylphenol triene (about 40%); manufactured by Tohoku Chemical Industries, Ltd.) was chemically bound to a hydroxy group of a cellulose (trade name: KC Flock W-50G manufactured by Nippon Paper Chemicals) to obtain cardanol-grafted cellulose. More specifically, the cardanol-grafted cellulose was prepared in accordance with the following procedure.

In a dry box, a reaction solvent was prepared from borontrifluoride diethyl ether ($BF_3$—$OEt_2$) (manufactured by Kanto Chemical Co., Inc.) (80 mL) and methylene chloride (100 mL) (manufactured by Kanto Chemical Co., Inc.) under a nitrogen gas atmosphere. To this, cellulose (2 g) was added and the mixture was stirred at room temperature for 2 hours. Thereafter, the cellulose was separated by filtration from the reaction solvent and dried under vacuum. Thereafter, to this, liquid-state cardanol (LB-7000) (100 mL) as mentioned above was added and a grafting reaction was performed while stirring at room temperature for 3 hours. After completion of the reaction, a product was separated by filtration, washed with acetone, extracted by Soxhlet and dried under vacuum at 105° C. for 5 hours to obtain a desired cardanol-grafted cellulose composition (2.5 g). $DS_{CD}$ was obtained from a yield, and $DS_{CD}$ was 0.16.

Note that the composition did not melt even if heated and did not exhibit thermoplasticity. Furthermore, since the composition could be neither molded nor casted, evaluation, such as a bending test and tensile test, was not performed.

TABLE 101A

|  |  | Reference Example 1 | Reference Example 2 | Reference Example 3 | Reference Example 4 | Reference Example 5 | Reference Example 6 |
|---|---|---|---|---|---|---|---|
| Amount of acetyl group | $DS_{Ace}$ | 2.1 | 2.1 | 2.1 | 2.1 | 2.1 | 2.1 |
|  | Mass fraction (%) | 16 | 20 | 21 | 21 | 23 | 26 |
| Amount of cardanol derivative | $DS_{CD}$ modified with succinic acid | 0.90 | 0.55 | 0 | 0 | 0 | 0 |
|  | $DS_{CD}$ modified with monochloro acetic acid | 0 | 0 | 0.55 | 0.80 | 0.44 | 0.30 |
|  | Mass fraction (%) | 56 | 46 | 43 | 53 | 38 | 29 |
| Amount of reactive hydrocarbon compound | $DS_{XX}$ | 0 | 0 | 0 | 0 | 0 | 0 |
|  | Mass fraction (%) | 0 | 0 | 0 | 0 | 0 | 0 |
| Addition amount of plasticizer (% by mass) |  | 0 | 0 | 0 | 0 | 0 | 0 |
| Bending strength (MPa) |  | 38 | 48 | 50 | 36 | 60 | 83 |
| Bending elastic modulus (GPa) |  | 0.80 | 1.1 | 1.2 | 0.80 | 1.4 | 1.9 |
| Bend-breaking strain (%) |  | >10 | >10 | >10 | >10 | >10 | >10 |
| Tensile strength (MPa) |  | 29 | 36 | 38 | 27 | 45 | 59 |
| Tensile elastic modulus (GPa) |  | 0.6 | 0.9 | 1.0 | 0.6 | 1.2 | 1.7 |
| Tensile breaking strain (%) |  | 57 | 55 | 53 | 57 | 51 | 48 |
| Glass transition temperature (° C.) (heat resistance) |  | 125 | 134 | 147 | 139 | 142 | 150 |
| Thermoplasticity (press moldability) |  | ◯ | ◯ | ◯ | ◯ | ◯ | ◯ |
| Water absorption rate (%) |  | 1.1 | 1.5 | 1.2 | 0.94 | 1.3 | 1.7 |
| Plant component ratio (%) |  | 71 | 70 | 73 | 76 | 72 | 71 |

TABLE 101B

|  |  | Reference Example 7 | Reference Example 8 | Reference Example 9 | Reference Example 10 | Reference Example 11 | Reference Example 12 | Reference Example 13 | Reference Example 14 | Reference Example 15 | Reference Example 16 |
|---|---|---|---|---|---|---|---|---|---|---|---|
| Amount of acetyl group | $DS_{Ace}$ | 2.1 | 2.1 | 2.1 | 2.1 | 2.1 | 2.1 | 2.1 | 2.1 | 2.1 | 2.1 |
|  | Mass fraction (%) | 25 | 26 | 21 | 24 | 25 | 31 | 24 | 20 | 18 | 20 |
| Amount of cardanol derivative | $DS_{CD}$ modified with succinic acid | 0 | 0 | 0 | 0 | 0 | 0 | 0 | 0 | 0 | 0 |
|  | $DS_{CD}$ modified with monochloro acetic acid | 0.30 | 0.22 | 0.44 | 0.24 | 0.30 | 0.08 | 0.27 | 0.40 | 0.55 | 0.30 |
|  | Mass fraction (%) | 28 | 22 | 36 | 22 | 29 | 9.4 | 25 | 30 | 39 | 23 |
| Amount of reactive hydrocarbon compound | $DS_{XX}$ | xx = BC 0.14 | xx = BC 0.27 | xx = BC 0.22 | xx = BC 0.42 | xx = BC 0.07 | xx = BC 0.16 | xx = BAA 0.15 | xx = BAA 0.40 | xx = BAA 0.28 | xx = BAA 0.52 |
|  | Mass fraction (%) | 4.0 | 8.0 | 5.4 | 12 | 1.8 | 5.7 | 7.3 | 16 | 11 | 21 |
| Addition amount of plasticizer (% by mass) |  | 0 | 0 | 0 | 0 | 0 | 0 | 0 | 0 | 0 | 0 |
| Bending strength (MPa) |  | 113 | 118 | 106 | 112 | 94 | 95 | 106 | 107 | 93 | 95 |
| Bending elastic modulus (GPa) |  | 2.2 | 2.6 | 2.1 | 2.2 | 1.9 | 2.9 | 2.5 | 2.0 | 1.9 | 2.1 |
| Bend-breaking strain (%) |  | >10 | >10 | >10 | >10 | >10 | 6.5 | >10 | >10 | >10 | >10 |
| Tensile strength (MPa) |  | 69 | 72 | 66 | 70 | 64 | 75 | 65 | 65 | 63 | 64 |
| Tensile elastic modulus (GPa) |  | 1.6 | 1.8 | 1.6 | 1.6 | 1.5 | 1.9 | 1.8 | 1.5 | 1.4 | 1.6 |
| Tensile breaking strain (%) |  | 48 | 47 | 52 | 47 | 50 | 30 | 45 | 46 | 48 | 45 |
| Glass transition temperature (° C.) (heat resistance) |  | 154 | 155 | 144 | 156 | 152 | 158 | 148 | 150 | 142 | 147 |
| Thermoplasticity (press moldability) |  | ◯ | ◯ | ◯ | ◯ | ◯ | ◯ | ◯ | ◯ | ◯ | ◯ |
| Water absorption rate (%) |  | 1.3 | 1.6 | 1.1 | 1.2 | 1.4 | 1.9 | 1.0 | 0.72 | 0.68 | 0.65 |
| Plant component ratio (%) |  | 68 | 64 | 68 | 61 | 69 | 62 | 65 | 60 | 66 | 55 |

TABLE 101C

| | | Reference Example 17 | Reference Example 18 | Reference Example 19 | Reference Example 20 | Reference Comparative Example 1 | Reference Comparative Example 2 | Reference Comparative Example 3 | Reference Comparative Example 4 | Reference Comparative Example 5 |
|---|---|---|---|---|---|---|---|---|---|---|
| Amount of acetyl group | $DS_{Ace}$ | 2.1 | 2.1 | 2.1 | 2.1 | 2.1 | 2.1 | 2.1 | 2.1 | 2.1 |
| | Mass fraction (%) | 26 | 27 | 26 | 22 | 36 | 20 | 16 | 24 | 29 |
| Amount of cardanol derivative | $DS_{CD}$ modified with succinic acid | 0 | 0 | 0 | 0 | 0 | 0 | 0 | 0 | 0 |
| | $DS_{CD}$ modified with monochloro acetic acid | 0.17 | 0.13 | 0.20 | 0.30 | 0 | 0 | 0 | 0 | 0 |
| | Mass fraction (%) | 17 | 13 | 20 | 25 | 0 | 0 | 0 | 0 | 0 |
| Amount of reactive hydrocarbon compound | $DS_{XX}$ | xx = PPA 0.25 | xx = PPA 0.35 | xx = CHC 0.22 | xx = BCC 0.30 | 0 | 0 | 0 | 0 | xx = PPA 0.47 |
| | Mass fraction (%) | 9.7 | 14 | 7.1 | 13 | 0 | 0 | 0 | 0 | 20 |
| Addition amount of plasticizer (% by mass) | | 0 | 0 | 0 | 0 | 0 | 45 | 56 | 34 | 0 |
| Bending strength (MPa) | | 106 | 108 | 111 | 109 | — | 15 | 11 | 24 | — |
| Bending elastic modulus (GPa) | | 2.5 | 2.6 | 2.5 | 2.5 | — | 0.41 | 0.29 | 0.72 | — |
| Bend-breaking strain (%) | | >10 | >10 | >10 | >10 | — | >10 | >10 | >10 | — |
| Tensile strength (MPa) | | 65 | 66 | 68 | 67 | 60 | — | — | — | 52 |
| Tensile elastic modulus (GPa) | | 1.4 | 1.4 | 1.6 | 1.5 | 2.3 | — | — | — | 1.9 |
| Tensile breaking strain (%) | | 60 | 58 | 55 | 50 | 9.0 | — | — | — | 16 |
| Glass transition temperature (° C.) (heat resistance) | | 143 | 142 | 146 | 150 | 227 | 40 | 25 | 71 | 152 |
| Thermoplasticity (press moldability) | | ○ | ○ | ○ | ○ | X | ○ | ○ | ○ | X |
| Water absorption rate (%) | | 1.9 | 1.8 | 1.8 | 1.4 | 17 | 5.1 | 4.3 | 5.7 | 4.5 |
| Plant component ratio (%) | | 61 | 58 | 64 | 65 | 64 | 35 | 28 | 42 | 51 |

TABLE 102

| | | Reference Example 21 | Reference Example 22 | Reference Comparative Example 6 | Reference Comparative Example 7 | Reference Comparative Example 8 |
|---|---|---|---|---|---|---|
| Amount of acetyl group | $DS_{Ace}$ | 2.4 | 2.4 | 2.4 | 2.4 | 2.4 |
| | Mass fraction (%) | 31 | 24 | 31 | 39 | 24 |
| Amount of cardanol derivative | $DS_{CD}$ modified with monochloro acetic acid | 0.19 | 0.50 | 0 | 0 | 0 |
| | Mass fraction (%) | 20 | 40 | 0 | 0 | 0 |
| Addition amount of plasticizer (% by mass) | | 0 | 0 | 0 | 20 | 40 |
| Bending strength (MPa) | | 120 | 59 | — | 50 | 20 |
| Bending elastic modulus (GPa) | | 2.8 | 1.5 | — | 2.3 | 0.80 |
| Bend-breaking strain (%) | | >10 | >10 | — | >10 | >10 |
| Tensile strength (MPa) | | 55 | 38 | 58 | — | — |
| Tensile elastic modulus (GPa) | | 1.8 | 1.0 | 2.1 | — | — |
| Tensile breaking strain (%) | | 34 | 53 | 11 | — | — |
| Glass transition temperature (° C.) (heat resistance) | | 154 | 134 | 216 | 90 | 63 |
| Thermoplasticity (press moldability) | | ○ | ○ | X | ○ | ○ |
| Water absorption rate (%) | | 2.1 | 1.2 | 9.0 | 3.1 | 2.6 |
| Plant component ratio (%) | | 66 | 71 | 61 | 49 | 36 |

TABLE 103

| | | Reference Example 23 | Reference Example 24 | Reference Example 25 | Reference Comparative Example 9 | Reference Comparative Example 10 | Reference Comparative Example 11 | Reference Comparative Example 12 |
|---|---|---|---|---|---|---|---|---|
| Amount of acetyl group | $DS_{Ace}$ | 1.0 | 0.18 | 0.18 | 1.0 | 0.18 | 1.0 | 0.18 |
| | Mass fraction (%) | 9.8 | 1.8 | 2.0 | 13 | 2.5 | 9.8 | 1.8 |
| Amount of butyryl/propionyl group | $DS_{Bu}$ or $DS_{Pr}$ | $DS_{Bu}$ 1.66 | $DS_{Pr}$ 2.49 | $DS_{Pr}$ 2.49 | $DS_{Bu}$ 1.66 | $DS_{Pr}$ 2.49 | $DS_{Bu}$ 1.66 | $DS_{Pr}$ 2.49 |
| | Mass fraction (%) | 27 | 27 | 36 | 37 | 46 | 27 | 34 |

TABLE 103-continued

|  |  | Reference Example 23 | Reference Example 24 | Reference Example 25 | Reference Comparative Example 9 | Reference Comparative Example 10 | Reference Comparative Example 11 | Reference Comparative Example 12 |
|---|---|---|---|---|---|---|---|---|
| Amount of cardanol derivative | $DS_{CD}$ modified with monochloro acetic acid | 0.34 | 0.33 | 0.21 | 0 | 0 | 0 | 0 |
|  | Mass fraction (%) | 27 | 27 | 19 | 0 | 0 | 0 | 0 |
| Amount of reactive hydrocarbon compound | $DS_{XX}$ | 0 | 0 | xx = BC 0.10 | 0 | 0 | 0 | 0 |
|  | Mass fraction (%) | 0 | 0 | 2.7 | 0 | 0 | 0 | 0 |
| Addition amount of plasticizer (% by mass) |  | 0 | 0 | 0 | 0 | 0 | 27 | 27 |
| Bending strength (MPa) |  | 45 | 49 | 60 | — | — | 23 | 15 |
| Bending elastic modulus (GPa) |  | 1.3 | 1.4 | 1.6 | — | — | 0.79 | 0.82 |
| Bend-breaking strain (%) |  | >10 | >10 | >10 | — | — | >10 | >10 |
| Tensile strength (MPa) |  | 35 | 39 | 43 | 36 | 40 | — | — |
| Tensile elastic modulus (GPa) |  | 0.85 | 0.87 | 1.0 | 1.0 | 1.1 | — | — |
| Tensile breaking strain (%) |  | 100 | 98 | 82 | 55 | 52 | — | — |
| Glass transition temperature (° C.) (heat resistance) |  | 94 | 92 | 100 | 135 | 143 | 59 | 59 |
| Thermoplasticity (press moldability) |  | ◯ | ◯ | ◯ | Δ | Δ | ◯ | ◯ |
| Water absorption rate (%) |  | 0.65 | 0.76 | 0.74 | 2.6 | 3.1 | 1.5 | 1.6 |
| Plant component ratio (%) |  | 60 | 61 | 57 | 50 | 52 | 36 | 38 |

TABLE 104

|  |  | Reference Example 26 | Reference Comparative Example 13 |
|---|---|---|---|
| Amount of cellulose | Mass fraction (%) | 24 | 24 |
| Amount of acetyl group | $DS_{Ace}$ | 0 | 2.1 |
|  | Mass fraction (%) | 0 | 13 |
| Amount of cardanol derivative | $DS_{CD}$ modified with monochloro acetic acid | 1.49 | 0 |
|  | Mass fraction (%) | 76 | 0 |
| Addition amount of plasticizer (% by mass) |  | 0 | 63 |
| Bending strength (MPa) |  | 25 | 9 |
| Bending elastic modulus (GPa) |  | 0.38 | 0.20 |
| Bend-breaking strain (%) |  | >10 | >10 |
| Tensile strength (MPa) |  | 17 | — |
| Tensile elastic modulus (GPa) |  | 0.26 | — |
| Tensile breaking strain (%) |  | 22 | — |
| Glass transition temperature (° C.) (heat resistance) |  | 84 | 21 |
| Thermoplasticity (press moldability) |  | ◯ | ◯ |
| Water absorption rate (%) |  | 1.9 | 4.0 |
| Plant component ratio (%) |  | 89 | 24 |

When Reference Examples 1 to 6 are compared to Reference Comparative Example 1, the cardanol-grafted cellulose resins (an acetyl group is also added to a cellulose hydroxy group) of the reference examples each had thermoplasticity (press moldability) and excellent bending properties without reducing a plant component ratio, and further tensile properties (particularly, breaking strain) and water resistance (water absorption rate) were improved, compared to the cellulose derivative (cellulose acetate) before grafting which had no thermoplasticity. Furthermore, when Reference Examples 1 to 6 are compared to Reference Comparative Examples 2 to 4, the cardanol-grafted cellulose resins (an acetyl group is also added to a cellulose hydroxy group) of the reference examples were more improved in bending properties, tensile properties and water resistance than the cellulose derivatives before grafting (cellulose acetate) which contained the plasticizer. In addition, high heat resistance (glass transition temperature) was obtained without reducing the plant component ratio.

As shown in Reference Examples 7 to 20, bending properties (particularly, bending strength) and tensile properties (particularly, tensile strength) can be even more improved while obtaining high water resistance by grafting with not only cardanol but also a reactive hydrocarbon.

In Reference Examples 21 and 22 and Reference Comparative Examples 6 to 8, compared to Reference Examples 1 to 20 and Reference Comparative Examples 1 to 5, the amount of acetyl group added to a hydroxy group of cellulose is increased. Even in these case, when Reference Examples 21 and 22 are compared to Reference Comparative Example 6, the cardanol-grafted cellulose resins of the reference examples each had thermoplasticity and excellent bending properties without reducing a plant component ratio, and further tensile properties (particularly, breaking strain) and water resistance were improved, compared to the cellulose derivative before grafting which had no thermoplasticity. Furthermore, when Reference Examples 21 and 22 are compared to Reference Comparative Examples 7 and 8, the cardanol-grafted cellulose resins of the reference examples were more improved in bending properties (particularly, bending strength), tensile properties and water resistance than the cellulose derivatives before grafting which contained the plasticizer. In addition, high heat resistance was obtained without reducing the plant component ratio.

As shown in Reference Comparative Examples 2 to 4, 7 and 8 containing plasticizer, excellent heat resistance was not obtained by adding the plasticizer alone. According to the reference examples, not only thermoplasticity can be imparted to a cellulose resin but also excellent heat resistance can be obtained.

Furthermore, as shown in Reference Comparative Example 5 in which a reactive hydrocarbon alone was grafted, thermoplasticity was not obtained only by grafting a reactive hydrocarbon alone, and bending properties, tensile properties (particularly, breaking strain) and water resistance were not improved. According to the reference example, not only thermoplasticity can be imparted to a cellulose resin but also excellent bending properties, tensile properties (particularly, breaking strain) and water resistance can be obtained.

Reference Examples 23 to 25 and Reference Comparative Examples 9 to 12, each are an example of a cellulose resin prepared by using a cellulose derivative having not only an acetyl group but also a butyryl group or a propionyl group added to a hydroxy group. Even in these case, when Reference Examples 23 to 25 are compared to Reference Comparative Examples 9 and 10, in the cardanol-grafted cellulose resins of the reference examples, excellent thermoplasticity and bending properties were obtained without reducing the plant component ratio, and further tensile properties (particularly breaking strain) and water resistance were improved, compared to the cellulose derivatives before grafting. Furthermore, when Reference Examples 23 to 25 and Reference Comparative Examples 11 and 12 are compared, the cardanol-grafted cellulose resins of the reference examples were more improved in bending properties (particularly, bending strength), tensile properties and water resistance than the cellulose derivatives before grafting which contained the plasticizer. In addition, high heat resistance was obtained without reducing the plant component ratio.

Reference Example 26 is an example of a cellulose resin prepared by using cellulose having a hydroxy group of cellulose to which an acyl group such as an acetyl group is not added. Even in this case, when Reference Example 26 is compared to Reference Comparative Example 13, the cardanol-grafted cellulose resin of the reference example was more improved in bending properties (particularly, bending strength), tensile properties and water resistance than the cellulose derivative of Reference Comparative Example 13, in which the cellulose derivative (cellulose acetate) contained a plasticizer (the weight ratio of the cellulose component is the same as the Reference Example 26). In addition, high heat resistance was obtained without reducing the plant component ratio.

As described above, according to the reference examples, it is possible to provide a cellulose resin improved in water resistance and having good thermoplasticity (press moldability) and sufficient heat resistance while maintaining a high plant component ratio (high vegetism). Furthermore, a press molded product having high bending properties can be obtained and a film molded product can be improved in tensile properties (particularly, toughness). Furthermore, according to the reference examples, a grafted cellulose resin having a high plant component ratio as well as high utilization ratio of non-edible parts can be obtained.

While the present invention has been described with reference to the exemplary embodiments and examples, the present invention is not limited to the above exemplary embodiments and examples. Various changes that can be understood by those skilled in the art may be made to the constitution and details of the present invention within the scope thereof.

This application claims the right of priority based on Japanese Patent Application No. 2011-082969 filed on Apr. 4, 2011 and Japanese Patent Application No. 2011-198743 filed on Sep. 12, 2011, the entire content of which are incorporated herein by reference.

The invention claimed is:

1. A cellulose resin produced by binding a hydrogenated cardanol comprising 3-pentadecylcyclohexanol, and cellulose or a derivative thereof through a reaction between a hydroxy group of the hydrogenated cardanol, a hydroxy group of the cellulose or a derivative thereof and isocyanate groups of a diisocyanate compound.

2. The cellulose resin according to claim 1, wherein the diisocyanate compound is a compound comprising a hydrocarbon group having 3 to 20 carbon atoms to which two isocyanate groups are bound.

3. The cellulose resin according to claim 2, wherein the number of the hydrogenated cardanol added to the cellulose or a derivative thereof per glucose unit thereof, $DS_{CD}$, is 0.1 or more.

4. The cellulose resin according to claim 2, wherein the number of remaining hydroxy groups per glucose unit of the cellulose or a derivative thereof, $DS_{OH}$, is 0.9 or less.

5. A resin composition containing the cellulose resin according to claim 2 as a base resin.

6. The cellulose resin according to claim 1, wherein the diisocyanate compound is an aliphatic diisocyanate comprising a straight-chain alkylene chain having 3 to 12 carbon atoms to both end carbon atoms of which an isocyanate group is bound.

7. The cellulose resin according to claim 6, wherein the number of the hydrogenated cardanol added to the cellulose or a derivative thereof per glucose unit thereof, $DS_{CD}$, is 0.1 or more.

8. The cellulose resin according to claim 6, wherein the number of remaining hydroxy groups per glucose unit of the cellulose or a derivative thereof, $DS_{OH}$, is 0.9 or less.

9. A resin composition containing the cellulose resin according to claim 6 as a base resin.

10. The cellulose resin according to claim 1, wherein the number of the hydrogenated cardanol added to the cellulose or a derivative thereof per glucose unit thereof, $DS_{CD}$, is 0.1 or more.

11. The cellulose resin according to claim 10, wherein the number of remaining hydroxy groups per glucose unit of the cellulose or a derivative thereof, $DS_{OH}$, is 0.9 or less.

12. A resin composition containing the cellulose resin according to claim 10 as a base resin.

13. The cellulose resin according to claim 1, wherein the number of remaining hydroxy groups per glucose unit of the cellulose or a derivative thereof, $DS_{OH}$, is 0.9 or less.

14. A resin composition containing the cellulose resin according to claim 13 as a base resin.

15. A resin composition containing the cellulose resin according to claim 1 as a base resin.

16. A molding material comprising the resin composition according to claim 15.

17. A method for producing a cellulose resin, comprising:
binding a hydrogenated cardanol comprising 3-pentadecylcyclohexanol, and a diisocyanate compound by reacting a hydroxy group of the hydrogenated cardanol and an isocyanate group of the diisocyanate compound to form a diisocyanate-added cardanol derivative, and
binding the diisocyanate-added cardanol derivative and cellulose or a derivative thereof by reacting an isocyanate group of the diisocyanate-added cardanol derivative and a hydroxy group of the cellulose or a derivative thereof.

18. The method for producing a cellulose resin according to claim 17, wherein the diisocyanate compound is a compound comprising a hydrocarbon group having 3 to 20 carbon atoms to which two isocyanate groups are bound.

* * * * *